(12) United States Patent
Takahashi et al.

(10) Patent No.: US 6,548,922 B1
(45) Date of Patent: Apr. 15, 2003

(54) 2-POLE STEPPER MOTOR FOR TIMEPIECE

(75) Inventors: Shigeyuki Takahashi, Kodaira (JP); Takanori Nanya, Sayama (JP); Takayasu Machida, Iruma (JP); Kazuo Suzuki, Tokorozawa (JP); Takeaki Shimanouchi, Hanno (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/719,369

(22) PCT Filed: Jun. 10, 1999

(86) PCT No.: PCT/JP99/03109

§ 371 (c)(1),
(2), (4) Date: Dec. 11, 2000

(87) PCT Pub. No.: WO99/64937

PCT Pub. Date: Dec. 16, 1999

(30) Foreign Application Priority Data

Jun. 11, 1998 (JP) .......................... 10/163682
Oct. 29, 1998 (JP) .......................... 10/307961
Feb. 26, 1999 (JP) .......................... 10/049386

(51) Int. Cl.[7] .............................................. H02K 37/00
(52) U.S. Cl. ............................................... 310/49 R
(58) Field of Search ........................ 310/49 R, 40 MM, 310/42, 162, 216, 254, 261, 266, 91; 29/596–598

(56) References Cited

U.S. PATENT DOCUMENTS

| | | | | |
|---|---|---|---|---|
| 3,256,453 A | * | 6/1966 | Haydon ..................... | 310/49 R |
| 4,041,336 A | * | 8/1977 | Sudler et al. .............. | 310/49 R |
| 4,066,947 A | | 1/1978 | Nakajima et al. .......... | 318/696 |
| 4,088,909 A | * | 5/1978 | Matsumura et al. ....... | 310/49 R |
| 4,277,704 A | * | 7/1981 | Giger et al. ............... | 310/49 R |
| 4,665,330 A | * | 5/1987 | Chatelain .................. | 310/49 R |
| 6,005,319 A | * | 12/1999 | Kondo ...................... | 310/49 R |

FOREIGN PATENT DOCUMENTS

| | | |
|---|---|---|
| JP | 49-132507 | 12/1974 |
| JP | 50-116010 | 9/1975 |
| JP | 51-1908 | 1/1978 |
| JP | 54-114710 | 9/1979 |
| JP | 55-83451 | 6/1980 |
| JP | 59-92585 | 6/1984 |
| JP | 59-136060 | 8/1984 |
| JP | 60-170430 | 9/1985 |
| JP | 63-97372 | 6/1988 |
| JP | 63-246692 | 10/1988 |
| WO | WO98/30869 | 7/1998 |
| WO | WO98/30939 | 7/1998 |

OTHER PUBLICATIONS

European Search Report dated Jul. 24, 2001.

* cited by examiner

Primary Examiner—Tran Nguyen
(74) Attorney, Agent, or Firm—Armstrong, Westerman & Hattori, LLP

(57) ABSTRACT

A stator (1) is made up by bonding a first stator part (1a) made of a high-permeability material to a second stator part (1b) made of a high-permeability material respectively by welding through the intermediary of connections (1c,1d) made of a low-permeability material or a nonmagnetic material, interposed therebetween. Paired recesses (5a, 5b) serving as holding torque setting means for holding a rotor (3) by a magnetic action are formed on the inner, periphery of a rotor hole (2) defined inside the stator (1) at the position forming an initial phase angle ($\theta_1$). A field coil (7) for excitation is magnetically bonded to opposite ends of the stator (1), thereby forming a two-pole step motor for a timepiece

4 Claims, 13 Drawing Sheets

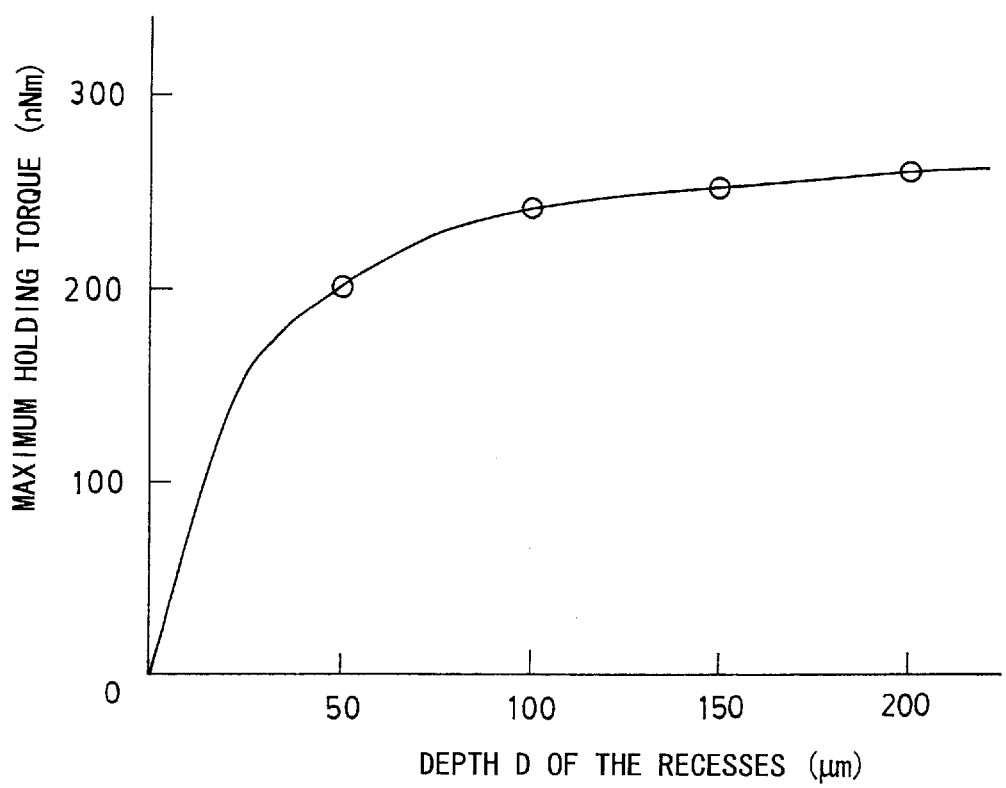
F I G. 9
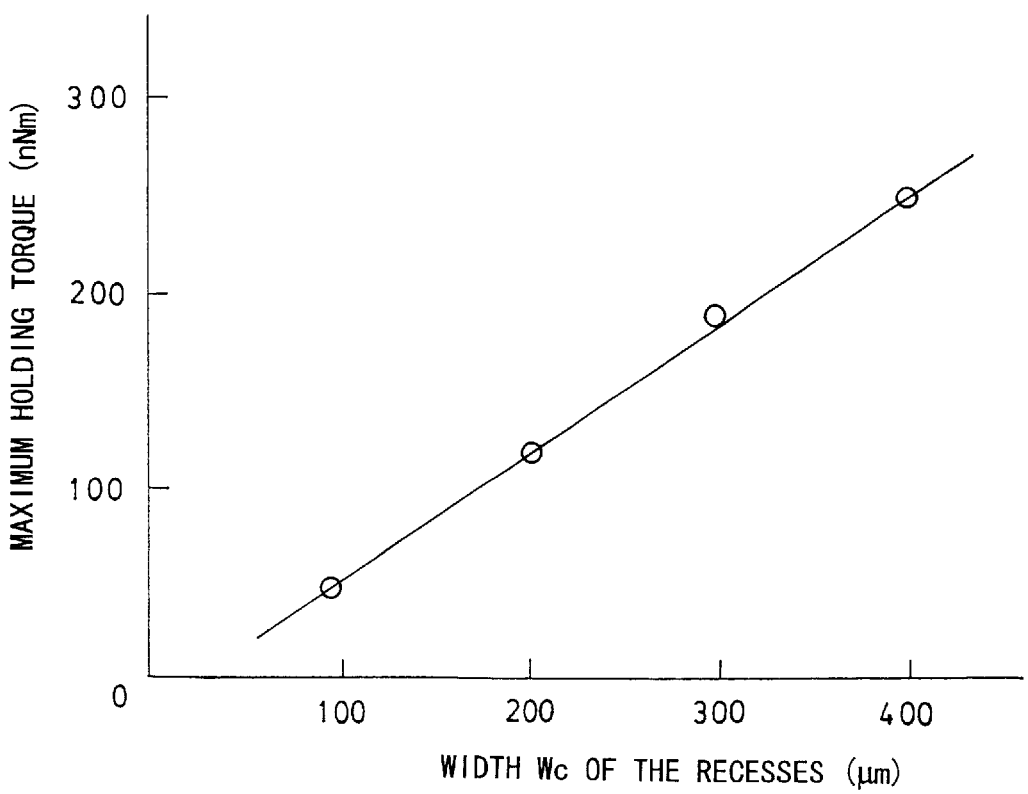
F I G. 10

2-POLE STEPPER MOTOR FOR TIMEPIECE

TECHNICAL FIELD

The invention relates to a two-pole step motor for an analog electronic timepiece.

BACKGROUND TECHNOLOGY

Since an analog electronic timepiece employs a cell for its power source, the analog electronic timepiece stops its function after continuous operation for a given length of time period due to exhaustion of its capacity. Accordingly, the cell need be replaced periodically with a new one, which has been quite troublesome to users.

Further, as the users have to ask specialist shops to do such replacement, it has been impossible to have the cell replaced immediately if the cell runs down when there is a need for use of the analog electronic timepiece, and consequently, this has caused a great deal of inconvenience to the users.

Since such exhaustion of the capacity of the cell of the analog electronic timepiece poses a major problem to the users, efforts have been made lately to study on prolongation of a service life of the cell in the analog electronic timepiece or to develop a timepiece capable of eliminating a need for replacement of a cell by incorporating a generator in the timepiece, activated following the motion of the users carrying the timepiece with them, or by the agency of a power generation mechanism such as a solar cell, and so forth, incorporated in the timepiece.

However, in the case of an analog electronic timepiece with such a power generation mechanism built therein, the timepiece is designed to be driven by power stored in a capacitor or a secondary cell built therein, however, there have been cases where it has been difficult to generate sufficient power as required all the time because application conditions of the timepiece varies from one user to another.

Accordingly, even with the timepiece incorporating the power generation mechanism built therein, it has been necessary to aim at achievement of lowering power consumption in order to keep the timepiece in a stable operational condition without interruption during usage.

Meanwhile, if use can be made of a cell which is large in size, having a large capacity, it is possible to achieve prolongation of the service life thereof, however, designing constraints imposed on a timepiece does not permit the cell to be excessively large in size. Accordingly, if prolongation of the service life of the cell is called for, it has been inevitable to achieving lowering of power consumption on the part of the timepiece.

Now, a mechanism of an analog electronic timepiece is broadly described hereinafter. It has a construction such that a two-pole step motor for a timepiece is intermittently driven in accordance with a reference signal generated by a quartz oscillator, and the like, and time display is performed by transmitting motion of the step motor to the hands of the timepiece via gears.

It follows therefore that from the viewpoint of power consumption, such an analog electronic timepiece can be broadly broken down into a circuit part incorporating the quartz oscillator and the like for generating the reference signal, and a step motor part for rotating the hands of the timepiece.

However, with analog electronic timepieces in current use, a circuit part is made up of a semiconductor integrated circuit wherein power consumption is rendered small, and consequently, a greater part of power is after all consumed for driving the step motor for handling the hands. Accordingly, reduction in power consumption of the step motor has a considerable effect on lowering of power consumption of a timepiece in whole.

FIG. 22 is a plan view showing a schematic construction of a conventional two-pole step motor for a timepiece.

The two-pole step motor for a timepiece (referred to hereinafter merely as "step motor") comprises a field coil 7 provided with a conductor 7b wound around a magnetic core 7a formed of a high-permeability material, and a stator 201 bonded to opposite ends of the magnetic core 7a of the field coil 7 by screws 8, 8, respectively, for magnetic connection.

The stator 201 is provided with a rotor hole 202 defined substantially at the center thereof, and a rotor 3 is rotatably disposed inside the rotor hole 202.

Further, the rotor 3 is comprised of a rotor magnet 3a and a rotor axle 3b, and the rotor magnet 3a is made of a ferromagnetic material and is formed in a low-profile columnar shape. The rotor axle 3b serving as a rotation axis is inserted into an axle hole defined at the center of the rotor magnet 3a in the direction normal to the plane of the figure so as to be integrally joined together, thereby magnetizing the rotor magnet 3a in such a way as to have two poles in the diametrical direction thereof.

The rotor 3 with opposite ends of the rotor axle 3b rotatably supported by bearings (not shown), respectively, is positioned at the center of the rotor hole 202. Further, the rotor 3 is constituted such that a gear is provided at one end of the rotor axle 3b, and rotatory motion thereof is transmitted via the gear to the hands of the timepiece.

Further, holding torque setting means is provided on the inner periphery of the rotor hole 202, so that the magnetic poles of the rotor magnet 3a are positioned so as to be oriented in a constant direction of an initial phase angle $\theta_1$ by the agency of the holding torque setting means when the step motor is out of operation, thereby stopping and holding the rotor 3 in that position with a predetermined holding torque.

With the step motor, by applying a driving voltage thereto, forward and reverse current are caused to flow alternately through the field coil 7, thereby a magnetic field oriented in a direction corresponding to the direction of the forward and reverse current, respectively, is generated inside the rotor hole 202 so as to correspond to the magnitude of the respective flowing current, and the magnetic field is caused to act on the rotor magnet 3a magnetized beforehand, so that the rotor 3 is rotated by 180 degrees (for one step) counterclockwise in FIG. 22.

The motion of the step motor, made for one step, is described hereinafter.

If the direction of a magnetic field produced inside the rotor hole 202 by magnetic fluxes which are generated when current is caused to flow through the field coil 7 is designated as an excitation direction line 12, the rotor 3 is held and stopped at a position where a line 4, which is the direction of magnetization of the rotor magnet 3a, and which interconnects the two poles thereof, is rotated by the initial phase angle $\theta_1$ counterclockwise in FIG. 22, relative to the excitation direction line 12, by the agency of the holding torque of the holding torque setting means, established by magnetic action between the magnetic poles of the rotor magnet 3a and the stator 201 in a state where no current flows through the field coil 7.

In this state, when current is caused to flow through the field coil 7 in such a direction as to cause the rotor 3 to rotate forward, magnetic fluxes occur to the field coil 7, and a magnetic field is generated inside the rotor hole 202, whereupon the rotor 3 is subjected to a rotational torque caused by an interaction of the magnetic field and the permanent magnetized charge of the rotor magnet 3a, starting rotation against the resistance of the holding torque. Upon flowing of current through the field coil 7 for a suitable duration only, the rotor 3 stops after being rotated through 180° up to a position of the next stop.

With the step motor of the constitution as described above, power consumption for a unit of time is expressed by the product of a strength of the current caused to flow through the filed coil 7 for excitation, and a cell voltage as applied. Since the cell voltage as applied in this case remains substantially constant, lowering of the power consumption of the step motor depends on how to reduce current flowing in the field coil 7 while satisfying driving characteristics required of the step motor.

Further, with the step motor, the rotational torque is caused to occur to the rotor 3 by causing current to flow in the field coil 7, thereby causing the rotor 3 to rotate against the resistance of the holding torque. Consequently, the smaller the holding torque, the smaller the rotational torque as required may be in proportion to the holding torque.

Since current which is caused to flow in the field coil 7 is proportional to the rotational torque, current flowing in the field coil 7 can be reduced if the holding torque can be reduced. As a result, it becomes possible to achieve lowering of power consumption of the step motor for a timepiece.

Now, the holding torque of the step motor for a timepiece has functions such that even when the timepiece is subjected to an impact when the timepiece is dropped, and so forth, the hands are securely held so as not to be caused to jump, thereby enabling correct time to be displayed while settling the hands at a correct stop position against the resistance of friction torque occurring to bearings and gears inside the timepiece.

Accordingly, it is not as simple as a case where the holding torque need only be rendered smaller in order to reduce power consumption, but it is required that the holding torque be set so as to meet the minimum holding torque as required to maintain the function of the timepiece.

As disclosed in International Publication No. WO 98/30939, it is described with reference to the holding torque as required for use in timepiece that jumping of the hands will not occur if kinetic energy occurring to the hands by an impact is smaller than a holding potential established by the holding torque of a rotor, that is, a magnetic potential difference.

Since kinetic energy received by the hands when subjected to the impact is proportional to the square of moment of the hands, the holding potential, that is, the holding torque can be rendered smaller by use of the hands with a smaller moment.

By so doing, it becomes possible to set the minimum holding torque as required at a very small value equivalent to a fraction of the holding torque of a step motor for a timepiece, thereby achieving lowering of power consumption of the timepiece.

Next, holding torque setting means, provided in a stator of the conventional step motor for a timepiece, is now described hereinafter.

As for the holding torque setting means, provided in the stator of the conventional step motor for a timepiece, there are primarily two types in construction as described below.

One type has a construction such that the stator 201 of the step motor for a timepiece, shown in FIG. 22, is formed of a high-permeability material, and as shown in FIG. 23, there are provided holes 6, 6 defined close to opposite ends of the stator 201 in the longitudinal direction, for bonding the stator to opposite ends of the magnetic core 7a of the field coil 7.

A rotor hole 202 provided substantially at the center of the stator 201 is defined in the shape of two semicircles joined together with the center of the respective semicircles deviated from each other to permit a holding torque and an initial phase angle $\theta_1$ (refer to FIG. 22) to be set.

By combining the two semicircles in such a way as to cause the center of the respective semicircles to deviate from each other, two stepped parts 204a, 204b having a gap amount G, respectively, are formed. With the stator 201, it is possible to set the holding torque to a desired value by adjusting the gap amount G.

The construction wherein such stepped parts 204a, 204b described above are formed inside the rotor hole 202 of the stator 201 is described in, for example, Japanese Patent Laid-open No. S 49-132507.

A stator wherein such stepped parts are formed inside a rotor hole thereof is hereinafter referred to as a gap type stator.

Next, the construction of another type of holding torque setting means is described hereinafter with reference to FIG. 24. In the figure, some components used in common is described where necessary by using the same reference numerals as described with reference to FIG. 22.

A stator 211 in this case is provided with a pair of recesses 205a, 205b formed at symmetrical positions against the center axis of the rotor hole 212 on the inner periphery of the rotor hole 212, as holding torque setting means in order to provide the holding torque and the initial phase angle of a rotor 3.

Further, a straight line 24 passing through the respective centers of the recesses 205a, 205b is disposed so as to be tilted at an angle of $\theta_{11}$ relative to an excitation direction 21 of the rotor hole 212.

With the stator 211, an angle which the straight line 24 passing through the respective centers of the recesses 205a, 205b forms with a straight line 27 passing through the center axis of the rotor hole 212 and orthogonal to the excitation direction of the stator 211, is designated as an installation angle $\theta_{12}$ of the recesses 205a, 205b expressed in a positive value when rotated in counterclockwise direction, and the initial phase angle $\theta_1$ (refer to FIG. 22) of the rotor 3 is set by adjusting the installation angle $\theta_{12}$.

In the case of the step motor for a timepiece, having the stator 211 of such a construction as described above, the holding torque of the rotor 3 is determined by the pair of the recesses 205a, 205b.

In this connection, the construction wherein the recesses 205a, 205b as described above are formed inside of the rotor hole 212 of the stator 211 is described in, for example, Japanese Patent Laid-open No. S 51-1908.

A stator wherein recesses are formed inside a rotor hole thereof is hereinafter referred to as a notched type stator.

As described in the foregoing, in the case of the conventional step motor employing the gap type stator, the magnitude of the holding torque and the initial phase angle can be adjusted by varying the gap amount of the stepped parts formed inside the rotor hole.

With the ordinary step motor for a timepiece, since the diameter of the rotor hole is in the order of 1700 $\mu$m on average, the maximum holding torque can be set to around 300 nNm by setting the gap amount of the stepped parts of a stator to about 40 to 50 μm.

However, if it is intended to further reduce the holding torque to a large extent in order to achieve lowering of power consumption, the gap amount need be rendered to be extremely small, as small as about 10 μm, and consequently, it becomes difficult in respect of precision with which to process the stator to establish a stable holding torque.

Further, if the gap amount is rendered to be extremely small as described above, this leads to resultant reduction in the initial phase angle (refer to $\theta_1$ in FIG. 22). As a result, this will result in requirement for large power consumption when driving the rotor, so that lowering of power consumption can not be achieved.

Further, in the case of the step motor employing the gap type stator construction, it is possible to set the holding torque to a small value even at the same gap amount without varying the initial phase angle by enlarging the diameter of the rotor hole, however, such enlargement of the diameter of the rotor hole will result in reduction of interaction between a magnetic field occurring inside the rotor hole and the rotor magnet.

That is, in this case, as electromechanical coupling constant decreases, the rotational torque occurring to the rotor by flow of current through the field coil is reduced.

As a result, even if the initial phase angle is set to a proper value by lowering the holding potential established by the holding torque, it will become necessary to increase current flowing in the field coil to compensate for a decrease in the rotational torque due to a decrease of the electromechanical coupling constant, so that a power-saving effect resulting from the holding torque being set to a small value will be offset, thereby rendering it impossible to achieve lowering of power consumption.

Meanwhile, in the case of the step motor employing the notched type stator construction, the initial phase angle can be set by the installation angle of the pair of the recesses while the holding torque is adjusted by either increasing or decreasing the sum of areas of the recesses formed on the inner periphery of the rotor hole, and consequently, if it is intended to render the holding torque considerably less than the present value in order to lower power consumption, this will require the sum of the areas of the pair of the recesses, in other words, dimensions of the recesses to be rendered extremely small. Accordingly, it will become difficult in respect of precision with which to process the stator to obtain a stable holding torque.

Further, with the notched type stator as well, it is possible to set the holding torque to a small value without varying the sum of the areas of the recesses by enlarging the diameter of the rotor hole, however, as with the case of the gap type stator, such enlargement of the diameter of the rotor hole will result in a decrease of the electromechanical coupling constant, so that lowering of power consumption can not be achieved.

As described hereinbefore, with the stator of the conventional construction as described above, if it is intended to set the holding torque to a small value in an attempt to further reduce power consumption, it has been necessary to render either the gap amount of the stepped parts formed in the stator or the dimensions of the recesses formed in the stator to be extremely small, thus posing difficulty in respect of precision with which to process the stator. Accordingly, it has been difficult to set a stable holding torque.

Consequently, with the step motor for a timepiece, adopting the conventional construction, it has been difficult to achieve lowering of power consumption.

DISCLOSURE OF THE INVENTION

The invention has been developed against the technical background described above, and it is an object of the invention to solve the problems as described above by devising a novel construction of a stator, and to provide a two-pole step motor for a timepiece which is suitable for lowering of power consumption, and which can be manufactured with ease.

To achieve the above objects, a two-pole step motor for a timepiece according to the invention comprises: a rotor made up of a rotor magnet and a rotor axle; a stator made of a high-permeability material, having a rotor hole in which the rotor is installed; and a field coil for excitation, provided with a magnetic core made of a high-permeability material around which a conductor is wound, and opposite ends of which are magnetically bonded to opposite ends of the stator, wherein the stator is provided with a plurality of holding torque setting means, disposed on the inner periphery of the rotor hole, at installation angles differing in the direction of the inner periphery.

Herein, the installation angle of the holding torque setting means refers to an installation angle relative to the direction orthogonal to an excitation direction of the stator, and the installation angle that differs by 180° is deemed to be an equivalent installation angle.

It is effective for attaining lowering of power consumption to set the initial phase angle $\theta_1$ which is an angle formed by the magnetic field direction line in the direction of a magnetic field produced inside the rotor hole and the magnetizing direction line of the rotor magnet at the standstill position of the rotor based on respective installation angles of the plurality of the holding torque setting means, in a range of 50 degrees to 70 degrees.

With the two-pole step motor for a timepiece according to the invention, even in the case where a single holding torque setting means can not be installed at an installation angle required for obtaining an initial phase angle and a holding torque as intended owing to presence of the axle hole of gears or holes of fixed pins which are formed around the rotor hole of the stator, the initial phase angle and the holding torque as intended can be obtained by breaking down a holding torque established by a pair of the holding torque setting means into vectors, and by installing two or more holding torque setting means corresponding to the respective vectors as broken down, at different installation angles and at locations avoiding the axle hole and the holes of fixed pins.

Further, the stator is preferably made up by bonding a first stator part made of a high-permeability material to a second stator part made of a high-permeability material through the intermediary of connections made of a low-permeability material or a nonmagnetic material.

In such a case, the stator has a construction such that it is magnetically separated into two portions, and consequently, a magnetic field inside the rotor hole for rotating the rotor can be efficiently produced by magnetic fluxes excited by the field coil, so that current caused to flow in the field coil can be reduced, thereby attaining lowering of power consumption.

Further, since the connections are made of either a low-permeability material or nonmagnetic material, there is no need of narrowing down the connections to an extreme extent, thereby enabling mechanical strength as required to be secured.

Furthermore, with the two-pole step motor for a timepiece described above, it is preferably that the connections where the first stator part is bonded to the second stator part serve as at least one of the plurality of the holding torque setting means while other holding torque setting means except the connections are disposed on the inner periphery of the rotor hole at installation angles differing from that for the connections.

In addition, the plurality of the holding torque setting means are preferably paired recesses or paired protuberances formed on the inner periphery of the rotor hole, respectively. Further, the other holding torque setting means as described above are preferably a pair of recesses or a pair of protuberances formed on the inner periphery of the rotor hole, including means formed in a shape asymmetrical with respect to the center of the rotor hole.

Then, the holding torque can be adjusted by varying the dimensions of the recesses or the protuberances, and the initial phase angle can be adjusted by varying the installation position of the recesses or the protuberances.

Further, among the holding torque setting means, the means formed in the shape asymmetrical with respect to the center of the rotor hole may be a pair consisting of a recess and a protuberance facing each other, formed on the inner periphery of the rotor hole, on opposite sides of the center of the rotor hole, or may comprise a recess or a protuberance formed on the inner periphery of the rotor hole only on one side of the center thereof.

Furthermore, the plurality of the holding torque setting means are preferably combination of those of different types with the installation angles thereof in the direction of the inner periphery of the rotor hole differing from each other.

In this connection, the combination of those of different types among the holding torque setting means is preferably combination of the gap type and the notched type, described in the foregoing, or combination of an oval type as described hereinafter and the notched type described above.

Still further, with the two-pole step motor for a timepiece having the plurality of the holding torque setting means including the means formed in a shape asymmetrical with respect to the center of the rotor hole, the first stator part is preferably bonded to the second stator part through the intermediary of the connections made of a low-permeability material or nonmagnetic material, the connections serving as at least one of the plurality of the holding torque setting means.

Similarly, with the two-pole step motor for a timepiece having the plurality of the holding torque setting means of different types, the first stator part is preferably bonded to the second stator part through the intermediary of the connections made of a low-permeability material or nonmagnetic material, the connections serving as at least one of the plurality of the holding torque setting means.

BRIEF DESCRIPTION OF THE DRAWINGS

FIG. 9 is a graph showing the relation between each depth of the recess and the maximum holding torque of the two-pole step motor for a timepiece in FIG. 5.

FIG. 10 is a graph showing the relation between each width of the recess and the maximum holding torque of the step motor for a timepiece in FIG. 5.

BEST MODE FOR CARRYING THE INVENTION

The embodiments of the inventions are now described in detail with reference to the accompanied drawings.

First Embodiment: FIGS. 1 to 4

Figure 1:
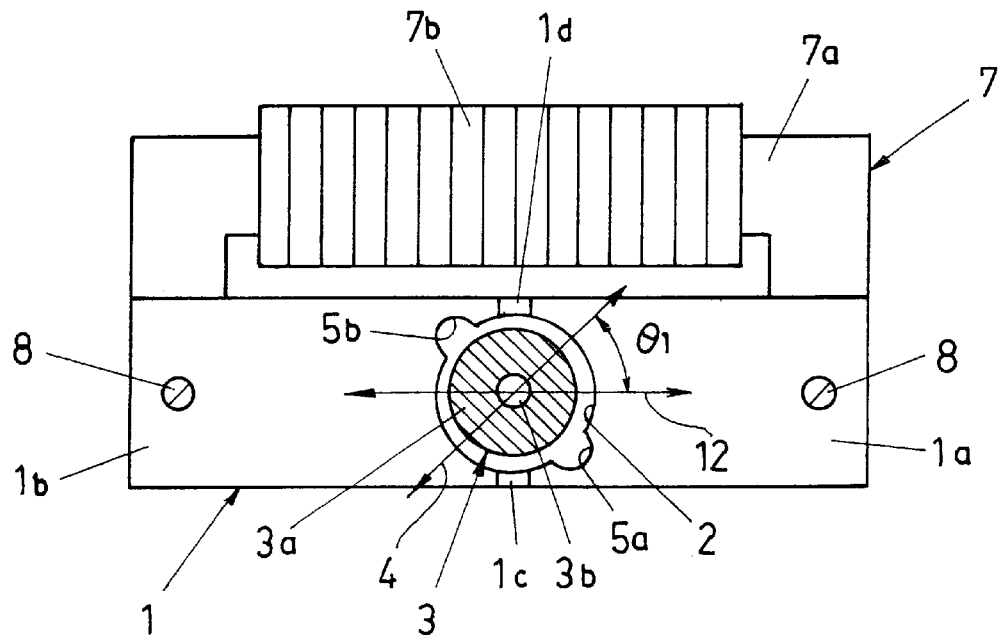
FIG. 1 is a plan view showing a schematic construction of a two-pole step motor for a timepiece according to a first embodiment of the invention.
Figure 2:
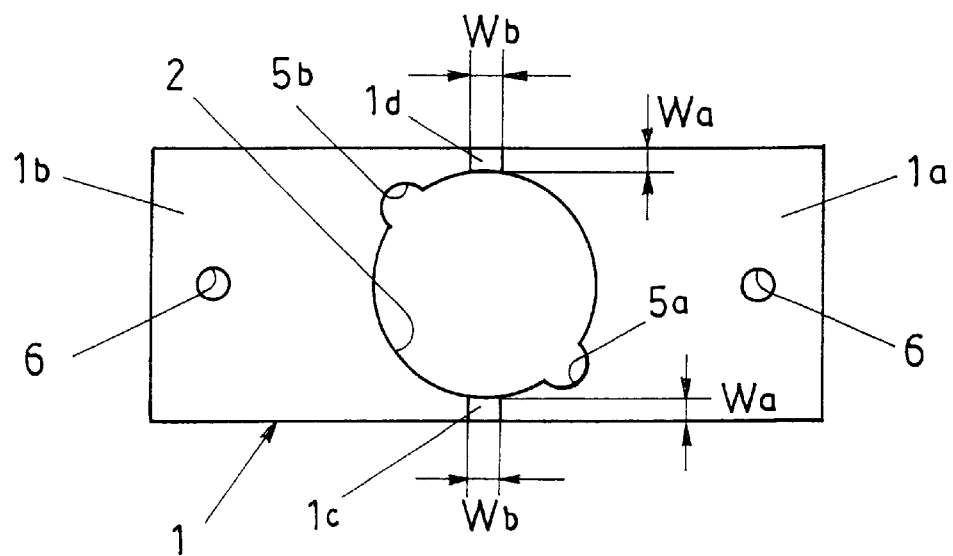
FIG. 2 is a plan view showing the construction of a stator of the two-pole step motor for a timepiece in FIG. 1.
Figure 3:
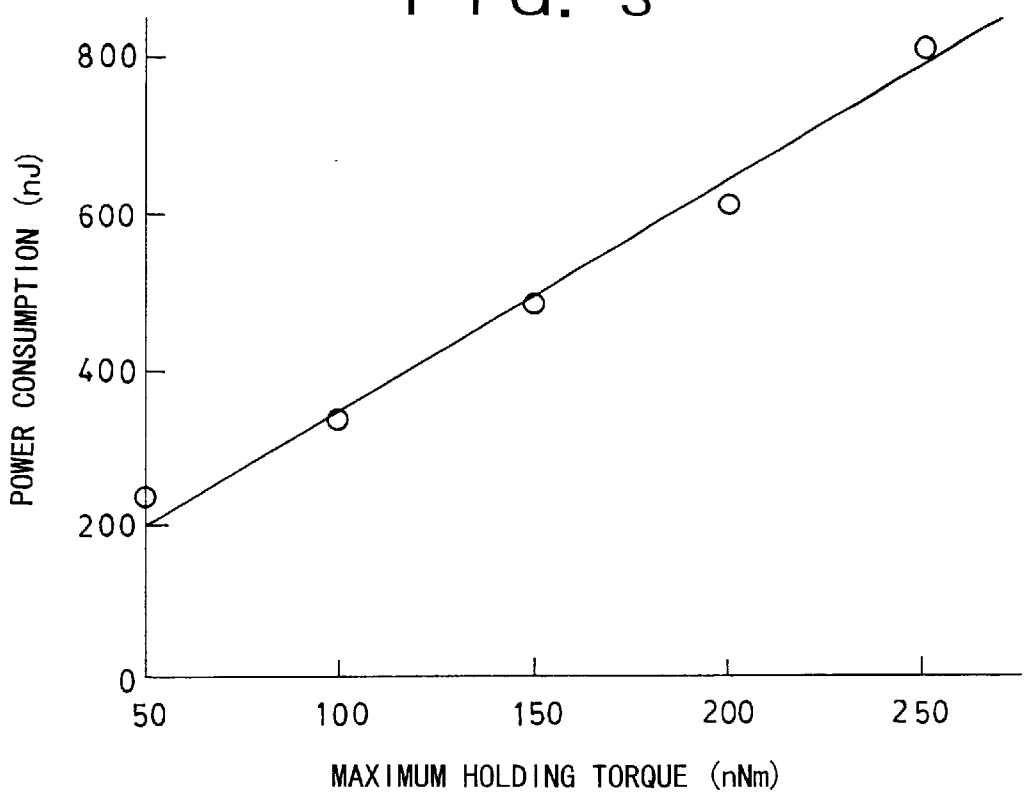
FIG. 3 is a graph showing the relation between a holding torque of the two-pole step motor for a timepiece in FIG. 1 and a power consumption of the same.
Figure 4:
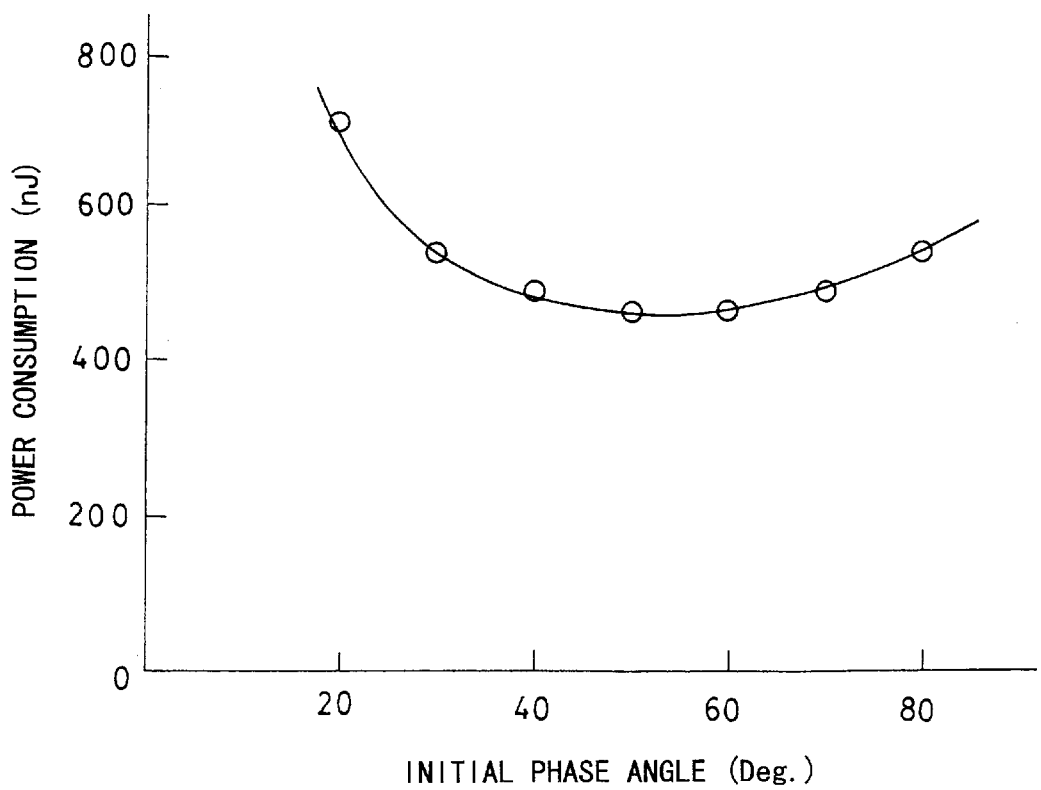
FIG. 4 is a graph showing the relation between an initial phase angle of the two-pole step motor for a timepiece in FIG. 1 and a power consumption of the same.

FIG. 1 is a plan view showing a schematic construction of a two-pole step motor for a timepiece according to a first embodiment of the invention, FIG. 2 is a plan view showing the construction of a stator of the two-pole step motor for a timepiece in FIG. 1, FIG. 3 is a graph showing the relation between a holding torque of the two-pole step motor for a timepiece in FIG. 1 and a power consumption of the same, and FIG. 4 is a graph showing the relation between an initial phase angle of the two-pole step motor for a timepiece in FIG. 1 and a power consumption of the same.

The two-pole step motor for a timepiece (hereinafter referred to simply as a step motor) comprises: a rotor 3 made up of a rotor magnet 3a and a rotor axle 3b; a stator 1 having a rotor hole 2 in which the rotor is installed; and a field coil 7 for excitation, provided with a magnetic core 7a made of a high-permeability material around which a conductor 7b is wound, and opposite ends of which are magnetically bonded to opposite ends of the stator 1.

Figure 22:
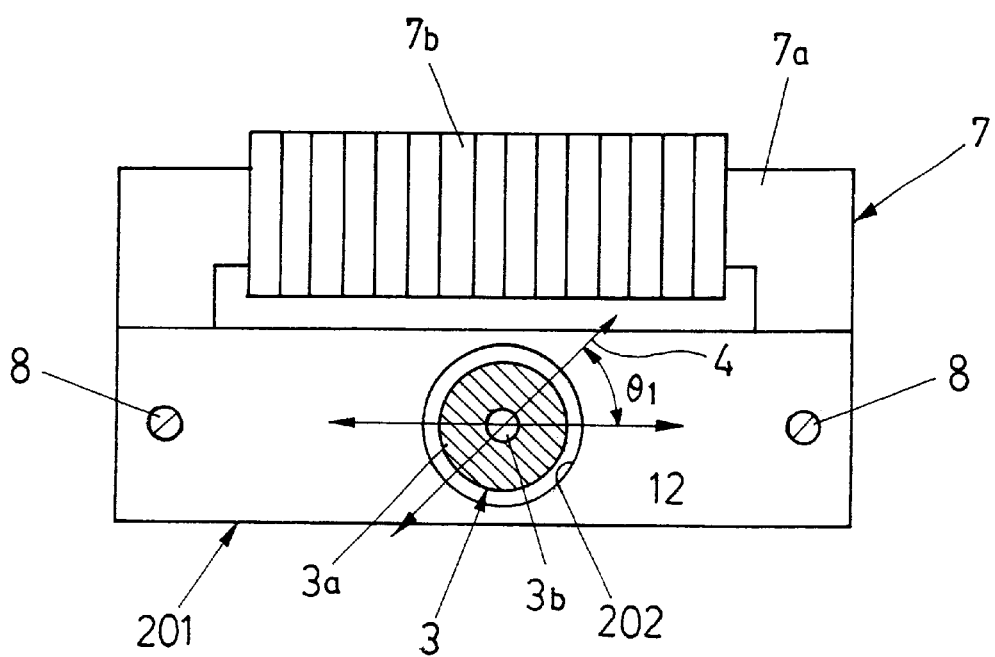
FIG. 22 is a plan view showing a schematic construction of a conventional two-pole step motor for a timepiece.

Inasmuch as the construction of the step motor is the same as that of the conventional two-pole step motor for a timepiece as explained with reference to FIG. 22, components which are the same as those shown in FIG. 22 are depicted by the same reference numerals, and the explanation thereof is omitted.

The stator 1 of this step motor comprises a first stator part 1a and a second stator part 1b formed of a high-permeability material respectively (hereinafter simply referred to as stator part 1a and stator part 1b) which are bonded to each other through the intermediary of connections 1c, 1d formed of a low-permeability material or nonmagnetic material respectively.

A plurality of holding torque setting means are provided at the inner periphery of the rotor hole 2 defined substantially at the center of the stator 1 for holding the rotor 3 at a given position of the rotating direction of the rotor 3 as shown in FIG. 1, namely, the position where a line 4 for connecting two magnetic poles which are magnetized in the diametrical direction of the rotor magnet 3a is positioned at an angle of initial phase angle $\theta_1$ when the step motor is not driven so that the rotor 3 is not rotated, with a given holding torque owing to a magnetic action between the magnetic poles of the rotor magnet 3a and the stator 1.

The plurality of holding torque setting means comprise a pair of recesses 5a, 5b formed in the inner periphery of the rotor hole 2 and a pair of connections 1c, 1d wherein both pairs are positioned at the symmetrical positions with respect to the center of the rotor hole 2, as shown in FIG. 2.

Figure 6:
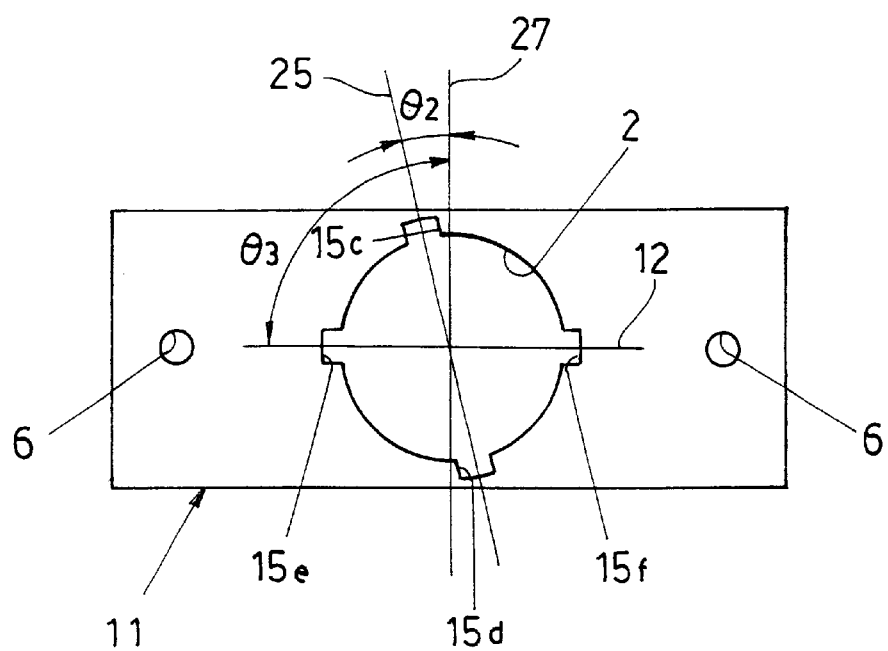
FIG. 6 is a plan view showing the construction of a stator of the two-pole step motor for a timepiece in FIG. 5.

The pair of recesses 5a, 5b and the pair of connections 1c, 1d are different from each other in installation angles as shown in the drawing. The installation angle is an arrangement angle relative to a line orthogonal to a magnetic field direction line 12 in an excitation direction of the stator 1, however, the detail thereof is explained with reference to a second embodiment and subsequent embodiments of the invention (FIG. 6 and subsequent figures).

Holes 6, 6 are formed on both end portions of the stator 1 in the longitudinal direction so as to connect magnetically to both terminals of the magnetic core 7a of the field coil 7.

In order to manufacture this stator 1, a pilot hole being the positioning hole for the later press working, a prepared hole for the rotor hole 2, and fixing holes 6, 6 are formed by pressing a high permeability band permalloy of 500 μm thickness, and the external shape partially remaining a joint part (not illustrated) to couple the band material is punched.

Next, slits of 200 μm width are punched on the connections 1c, 1d, wires of predetermined length made of a low permeability or non-permeability material are inserted in the slits, and the stator part 1a and the stator part 1b separated by the slits are joined to be matched by the laser welding.

Then, the rotor hole 2 and the recesses 5a, 5b are punched by press working, and finally the joint part to couple the band material is punched to complete the external shape working. And, the magnetic annealing is applied to the above band material that completed the external shape working to make up the stator 1 of the step motor.

Described next is a result of an experiment which is performed for determining a proper condition necessary for achieving lowering of power consumption when forming the step motor into which the stator 1 having the foregoing construction is integrated.

With the experiment, the relation between a holding torque of the step motor and the power consumption, the relation between an initial phase angle and a power consumption, and the relation between a power consumption and the construction of the connections of the step motor were checked.

The experiment was performed by the known two-pole step motor for a timepiece into which the stator 1 according to the first embodiment of the invention was integrated so as to perform measurement. A chopper driving waveform is used as a driving waveform and an ON/OFF ratio of each pulse of the driving waveform is adjusted, and determined the minimum consumption power capable of performing a normal driving.

Particularly, regarding the stator 1 that was used for measurement, the portion of the recesses 5a, 5b are not formed by press working but they are formed by an electric discharge machining in accordance with varieties of measurement conditions before a magnetic annealing is applied thereto.

First of all, the relation between the holding torque and the power consumption is described.

The power consumption in the step motor for a timepiece can be probably achieved by reducing the holding torque because a current necessary for excitation caused to flow in the field coil 7 can be reduced by reducing the holding torque.

Accordingly, the change of the power consumption when the holding torque was changed actually was checked with experiments.

With regard to the stator 1 used for the measurements, several kinds having different cuts of depths of the semicircular recesses 5a, 5b provided on the inner periphery of the rotor 2 were prepared to adjust the holding torque. The self-made measuring instrument of the rotor rotational angle measured the angular velocity against the displacement angle of the rotor 3, and from the measured results and the inertia of the rotor 3, the equation of motion was solved, thereby calculating the holding torques as to the stator 1.

And, the power consumption was calculated through integrating the products of a current caused to flow through the coil 7 and a drive voltage applied across it when the motor was driven for one step. Further, since the magnitude of the holding torque depends upon the displacement angle, the comparison of the measurement was made using the maximum holding torque. And, for the maximum holding torque of the stator 1 used for the measurements, the torques of 50 nNm through 250 nNm were prepared in increments of about 50 nNm.

The measurement result by this experiment is shown in FIG. 3. According to the measurement result, when the maximum holding torque is 250 nNm, the power consumption is about 800 nJ, while when the maximum holding torque is lowered to 100 nNm, the power consumption becomes about 350 nJ, from which it has been found that the relation between the set maximum holding torque and the power consumption necessary for driving for one step is substantially proportional.

In such a manner, since when the holding torque is reduced to half, the power consumption is also reduced to half, so that it has been found that the reduction of the holding torque has a great effect on the reduction of the power consumption.

Meanwhile, as mentioned above, in the step motor for a timepiece, the minimum holding torque is required to prevent the hands from jumping by an impact when the timepiece is dropped, or to indicate an exact time, and to enable hands to be stably stopped at the standstill position against the resistance of frictional torque produced at the bearing and gears.

If a motion energy which hands of a timepiece receive due to the impact is smaller than the holding potential formed by the holding torque of the rotor, the jumping of the hands do not occur. That is, when the moment of hands is adjusted to be small, the holding potential can be made small, the holding torque can be made small.

In such a manner, when the moment of hands is adjusted to be small, the minimum holding torque as required can be reduced to an extremely small holding torque, namely, to a fraction of the holding torque of the ordinary step motor for a timepiece.

As mentioned above, it has been found, from the measurement result shown in FIG. 3, that the reduction of the holding torque is effective for the reduction of the power consumption, and this holding torque can be reduced to an extremely small value, namely, at a fraction of a holding toque of an ordinary step motor for a timepiece.

Then, the relation between the initial phase angle and the power consumption is described.

The initial phase angle $\theta_1$ shown in FIG. 1 shows a phase difference between the rotary torque and the holding torque, and it is an angle formed by the magnetic field direction line 12 in the direction of a magnetic field produced inside the rotor hole 2 and the magnetizing direction line 4 of the rotor magnet 3a at the standstill position of the rotor 3, which is a very important parameter for driving the step motor.

With the experiment, several kinds of stators 1 are used, which are set the maximum holding torque to a fixed value of 150 nNm and changed the setting positions of the recesses 5a, 5b formed on the inner periphery of the rotor hole 2, thereby changing only the initial phase angle so as to check the relation between the initial phase angle and the power consumption.

Further, the initial phase angle is calculated by measuring the angular velocity relative to the displacement angle of the rotor 3 by a self-prepared rotor rotary angle measuring device and also by measuring a counter-electromotive current produced in the field coil 7 when the rotor 3 performs a rotary motion.

The power consumption is calculated by integrating the product of the current caused to flow through the field coil 7 and a drive voltage applied across it when the step motor is driven for one step. The initial phase angle of the stator 1 used in the measurement ranges from 20 degrees to 80 degrees in increments of substantially 10 degrees.

A measurement result by the experiment is shown in FIG. 4. According to the measurement result, the power consumption is reduced sharply when the initial phase angle ranges from 20 degrees to 40 degrees and it becomes the minimum when the initial phase angle ranges from 50 degrees to 60 degrees, and it is increased gently when the initial phase angle is increased thereafter.

Generally speaking, although 45 degrees are used as the optimum value of the initial phase angle, it has been found from this experiment where the maximum holding torque is reduced to the small value such as 150 nNm that the optimum value of the initial phase angle where the power consumption becomes the minimum is transferred to the side of an angle that is larger than 45 degrees. From the foregoing result, it has been found that the achievement of lowering power consumption of the step motor for a timepiece requires the setting of the optimum initial phase angle. It has been found, when the maximum holding torque is reduced to a small value such as 150 nNm, the optimum initial phase angle becomes larger than 45 degrees and the same angle becomes 50 to 60 degrees according to the present measurement result.

Then, the relation between the power consumption and the construction of the connections of the stator is now described.

In the case of the construction of the stator 1 as shown in FIG. 2, where the stator part 1a and stator part 1b of the stator 1 are connected to each other by connections 1c, 1d that are made of a low-permeability material or nonmagnetic material, it is possible to separate the stator 1 into the stator part 1a and the stator part 1b so that a magnetic field necessary for rotating the rotor 3 can be produced efficiently inside the rotor hole 2.

Accordingly, an experiment for checking the relation between the connections and the power consumption is performed.

Figure 25:
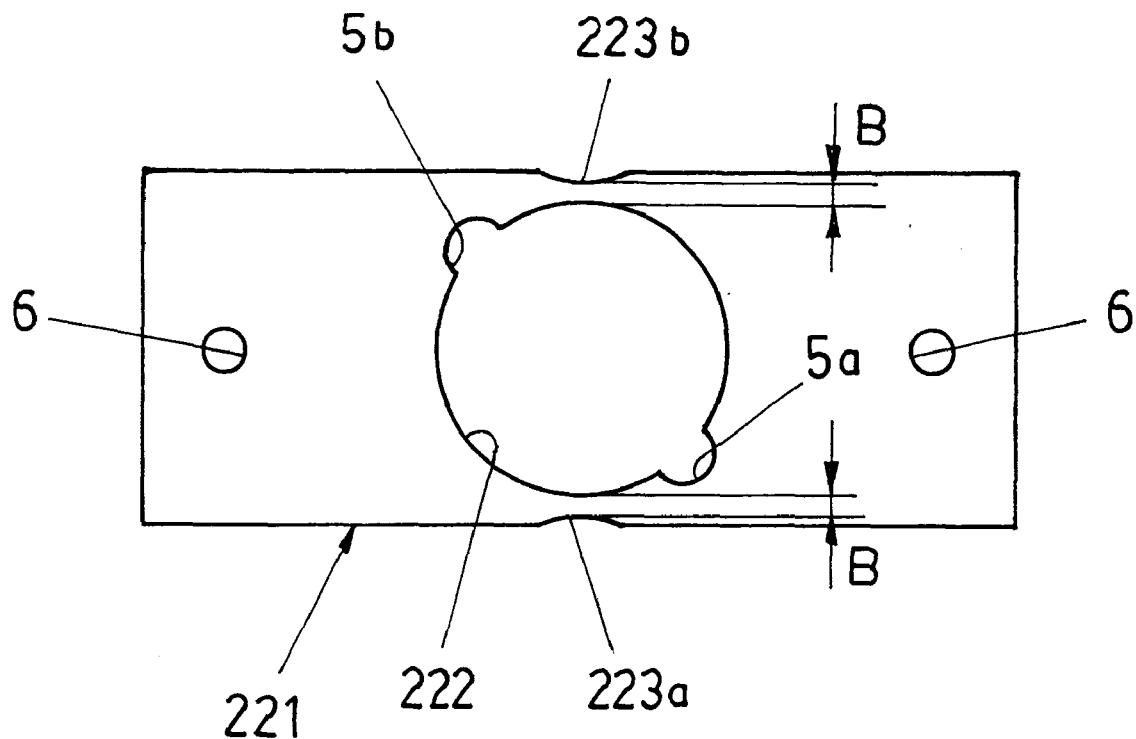
FIG. 25 is a plan view showing another construction of a stator of a conventional step motor for a timepiece like FIG. 24.

With this experiment, a case using the stator 1 shown in FIG. 2 is compared with a case using the stator 221 having a pair of recesses 5a, 5b used in the conventional step motor for a timepiece shown in FIG. 25.

In the case of using the conventional stator 221, two kinds of stators are prepared, namely, one having a connection 223a, 223b made of a high-permeability material with the minimum width B of 100 $\mu$m and another having a connection 223a, 223b made of the same material with the minimum width B of 200 $\mu$m.

On the other hand, the stator 1 having the construction as explained with reference to FIG. 2 has each width Wa between both ends of the connections 1c, 1d is 300 $\mu$m, respectively, while each interval Wb between the stator part 1a and stator part 1b is 200 $\mu$m, respectively.

Suppose that both the stators 1 and 221 to be compared with each other have the same holding torque and the initial phase angle.

It has been found as the result of the experiment that the rotor can not be rotated in the case of using the conventional stator 221 having the connections 223a, 223b each having minimum width B of 200 $\mu$m because a sufficient magnetic field can not be produced inside the rotor hole 222 by the employed driving waveform.

On the other hand, it has been observed that the rotor can be rotated in the case of using the stator 221 that is prone to produce a magnetic saturation by making the minimum width B of each interval of the connections 223a, 223b being 100 $\mu$m.

As a result of comparison between a power consumption at that time and that when using the stator 1, it has been observed that the power consumption when using the stator 1 can be reduced by about 20% compared with the case using the stator 221.

Further, since the connections 1c, 1d of the stator 1 are made of a low-permeability or nonmagnetic material, the connections are not necessary to be extremely small, so that a sufficient mechanical strength can be secured.

As a result of the experiment, it has been observed that the stator 1 is preferable to have the connections 1c, 1d made of a low-permeability material or nonmagnetic material in view of the achievement of lowering of power consumption.

In view of the result of checking the relation between the holding torque of the step motor for a timepiece and power consumption, the relation between the initial phase angle and the power consumption, and the relation between the power consumption and the structure of the connections, it has been observed that there are following three conditions necessary for realizing the lowering power consumption of the step motor for a timepiece.

That is, the first is that the holding torque is to be the minimum as required. The second is that an optimum initial phase angle can be set independently of a holding torque. The third is that the stator has a construction to be divided magnetically into two portions at the right and left sides.

Accordingly, if a stator that satisfies the foregoing three conditions at the same time is used, the intended lowering of power consumption of the step motor for a timepiece can be achieved.

That is, more in detail, as shown in FIG. 2, it is most preferable to structure the stator 1 such that a plurality of recesses 5a, 5b are formed on the inner periphery of the rotor hole 2 so as to set the holding torque and the initial phase angle $\theta_1$ independently from each other, and the two divided stator part 1a and stator part 1b are bonded to each other by the connections 1c, 1d made of a low-permeability or nonmagnetic material.

If the stator 1 has such a construction, the holding torque can be adjusted depending on the sizes of the recesses 5a, 5b and the initial phase angle can be adjusted by changing the setting positions of the recesses 5a, 5b, so that the holding torque adapted for the achieving lowering of power consumption and the initial phase angle can be set independently of each other.

The step motor embodying the foregoing construction was actually manufactured, and a power consumption thereof was measured, then the effect relating to the lowering of power consumption was checked, which is described hereinafter.

With the experiment, a power consumption of the known two-pole step motor for a timepiece incorporated therein the stator 1 of the first embodiment of the invention instead of the conventional stator is measured.

The stator 1 used in the experiment employs a permalloy having a thickness of 500 μm as a material, and the connections 1c, 1d employs Nichrome. The dimensions of the connections 1c, 1d are set to 300 μm in width Wa while an interval Wb between the stator part 1a and stator part 1b shown in FIG. 2 is set to 200 μm.

Further, the diameter of the rotor hole 2 formed in the stator 1 is set to 1300 μm, and the initial phase angle is set to 60 degrees by adjusting the sizes and setting positions of the recesses 5a, 5b formed on the inner periphery of the rotor hole 2, while the holding potential is set to 100 nNm. A samarium cobalt magnet having an outer diameter of 800 μm and a thickness of 400 μm is used as the rotor magnet 3a.

When a power consumption of the step motor for a timepiece in which the stator 1 is incorporated is checked, it was possible to achieve a power consumption of about 300 nJ for one step.

As a result, a power consumption was reduced by about 20% compared with the two-pole step motor for a timepiece incorporated therein the conventional stator 221 as explained with reference to FIG. 25.

Second Embodiment: FIGS. 5 to 10

A two-pole step motor for a timepiece according to a second embodiment of the invention is now described with reference to FIGS. 5 to 10.

Figure 5:
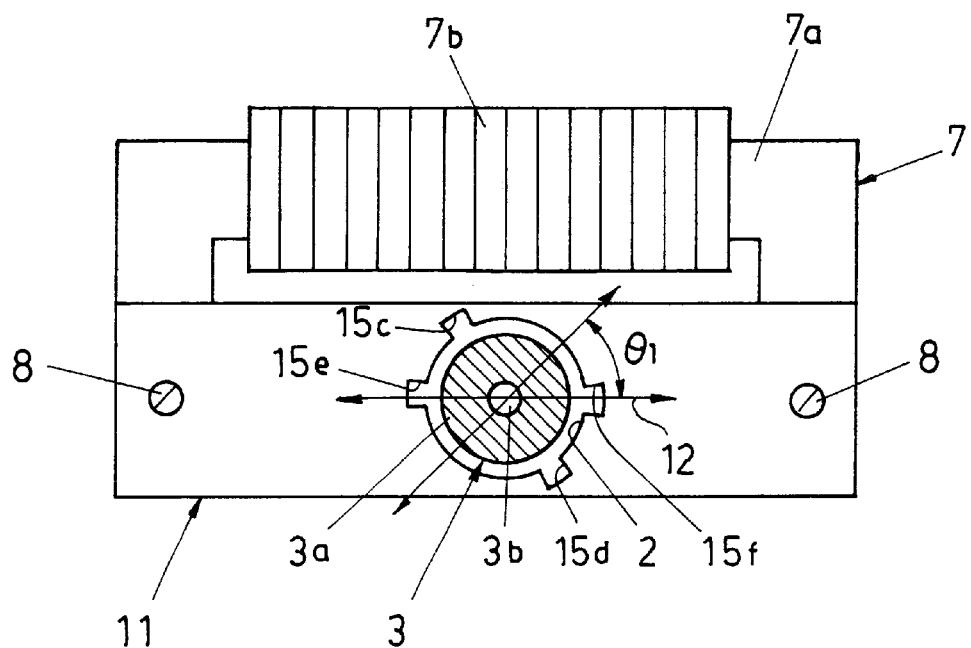
FIG. 5 is a plan view showing a schematic construction of a two-pole step motor for a timepiece according to a second embodiment of the invention like FIG. 1.
Figure 7:
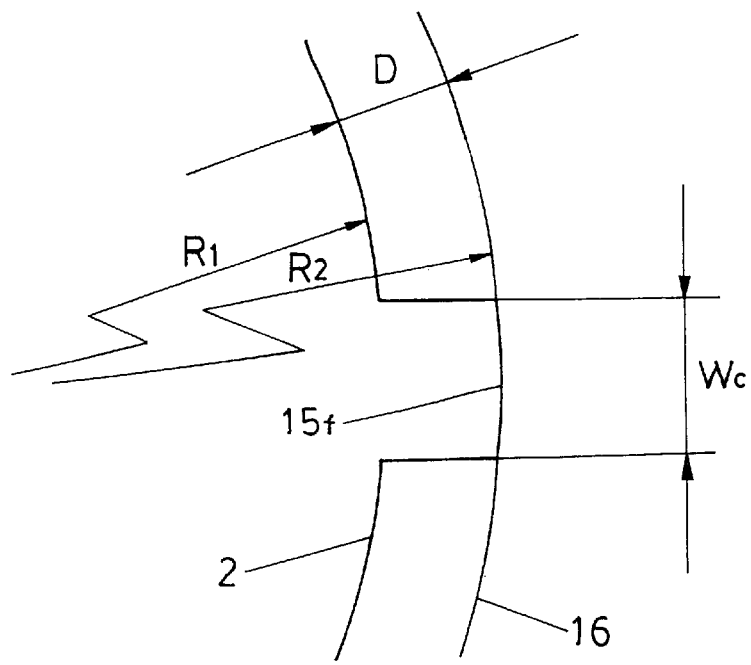
FIG. 7 is a plan view enlarging a recess provided in the stator serving as holding torque setting means in FIG. 5.

FIG. 5 is a plan view of a two-pole step motor for a timepiece according to a second embodiment of the invention like FIG. 1, FIG. 6 is a plan view showing the construction of a stator of the two-pole step motor for a timepiece in FIG. 5 and FIG. 7 is a plan view enlarging a recess provided in the stator and serving as holding torque setting means.

The two-pole step motor for a timepiece according to the second embodiment is the same as that of the first embodiment of the invention as explained with reference to FIGS. 1 to 4 except the construction of a stator, and hence the explanation for the same components are omitted.

The two-pole step motor for a timepiece according to the second embodiment as shown in FIG. 5 has a stator 11 having the shape as shown in FIG. 6, and two pairs of recesses, i.e. one pair of recesses 15c, 15d and another pair of recesses 15e, 15f serving as a plurality of holding torque setting means are formed on the inner periphery of the rotor hole 2 at the installation angles which are different from each other in the peripheral direction.

One pair of recesses 15c, 15d and another pair of recesses 15e, 15f are formed at the positions which are symmetrical with respect to the center of the rotor hole 2.

The stator 11 is made of a high-permeability material, and one pair of recesses 15c, 15d and another pair of recesses 15e, 15f are formed respectively to set a holding torque and an initial phase angle $\theta_1$, and an angle formed by a straight line 25 passing through centers of the recesses 15c, 15d and a straight line 27 passing through the center of the rotor hole 2 and orthogonal to a magnetic field directed line 12 in an excitation direction of the stator 1 is defined as an installation angle 02 of the recesses 15c, 15d.

Further, an angle formed by a straight line passing through the centers of another pair of recesses 15e, 15f (it conforms to a magnetic filed directed line 12 in FIG. 6) and the line 27 is defined as an installation angle $\theta_3$ of recesses 15e, 15f. Both the installation angles $\theta_2$, $\theta_3$ define a positive value in a counterclockwise direction in FIG. 6.

If the installation angles between two holding torque setting means are different from each other by 180 degrees relative to the peripheral direction of the rotor hole 2, they are considered to be the same installation angles. The reason is that if the phase difference of the installation angles of the two-pole step motor is 180 degrees, an electric phase difference becomes 360 degrees which is double the installation angles, and hence the same directed torque operates in the two holding torque setting means.

All the respective recesses 15c to 15f have the same sizes and shapes, wherein the recess 15f as shown in an enlarged view of FIG. 7 has a substantially rectangular shape formed by cutting the portion encircled between the inner diameter of the rotor hole 2 and a circular arc 16 of a circle that is concentric the rotor hole 2, and each width of the cut or notched portions is defined as a width Wc. Each depth D of the respective recesses 15c to 15f is the difference between the radius R1 of the rotor hole 2 and a radius R2 of the circular arc 16.

When the stator 11 is manufactured, it is formed of a band material having a thickness of 500 μm and made of permalloy which is a high-permeability material, and press working is applied to the band material to form a pilot hole being the positioning hole for the press working, a prepared hole for the rotor hole 2, and fixing holes 6, 6, and the external shape partially remaining a joint part (not illustrated) to couple the band material is punched.

Thereafter, the rotor hole 2 and the parts of the recesses 15c, 15d and recesses 15e, 15f are punched by press working, and finally the portion to be coupled to the band material is punched, thereby completing the external shape working of the stator 11. Thereafter, the magnetic annealing is applied to the band material to make up the stator 11 of the step motor.

Described next is the result of experiment that is performed for checking the relation between the initial phase angle $\theta_1$ and the holding torque when the installation angles $\theta_2$, $\theta_3$ of the two pairs of recesses 15c, 15d and 15e, 15f are respectively varied in the step motor using the stator 11 having the foregoing construction.

The experiment is performed using a rotary information measuring device as disclosed in International Patent Publication No. WO 98/30869, wherein a holding torque is determined by solving equation of motion based on the change of angular velocity of the rotor relative to the displacement angle of the rotor that is directly measured.

Further, the initial phase angle $\theta_1$ is determined by the displacement angle of the rotor that is directly measured and a counter electromotive force that is measured at the same time with the variation of an angular velocity relative to the displacement angle of the rotor.

The step motor used in the measurement uses the stator 11 as explained with reference to FIG. 6 by which the stator of known step motor for a timepiece is replaced, by which the initial phase angle $\theta_1$ and the holding torque are respectively measured.

The recesses 15c, 15d and recesses 15e, 15f of the stator 11 of the step motor used in the measurement are formed by electric discharge machining while press working is not applied thereto at the position where the installation angles $\theta_2$, $\theta_3$ are formed before magnetic annealing is applied.

Thereafter, a plurality of stators 11 are prepared wherein the installation angle $\theta_2$ of one pair of recesses 15c, 15d is set to 15 degrees while the installation angle $\theta_3$ of the other pair of recesses 15e, 15f is set to a range from 45 degrees to 90 degrees that is varied in increments of 15 degrees, and an initial phase angle $\theta_1$ and a holding torque of the step motor incorporating therein these stators 11 are measured.

All the recesses 15c to 15f of the respective stators 11 have the width Wc of 400 μm, the depth D of 150 μm.

A plurality of stators 211 are prepared to compare with a step motor for timepiece having the conventional construction wherein each width Wc of one pair of recesses 205a, 205b is set to 400 μm, each depth D is set to 150 μm, an installation angle $\theta_{12}$ is set to range from 30 to 75 degrees in increments of 15 degrees, and the initial phase angle $\theta_1$ (refer to FIG. 22) and the holding torque of the step motor incorporating these stators 211 therein are measured.

According to the measurement result, in the step motor incorporated therein the stator 211 having the conventional construction, the initial phase angle $\theta_1$ is conformed to the installation angle $\theta_{12}$ within a measuring error. Further, the maximum holding torque is 250 nNm and is fixed to this value without depending on the installation angle $\theta_{12}$.

From this measurement result, it has been found that in the step motor having the construction using the conventional stator 211, the initial phase angle $\theta_1$ is determined by the installation angle $\theta_{12}$ and the maximum holding torque is not dependent on the installation angle $\theta_{12}$.

Described next is a result of experiment for checking the relation between the dimensions of a pair of recesses and the maximum holding torque.

Figure 24:
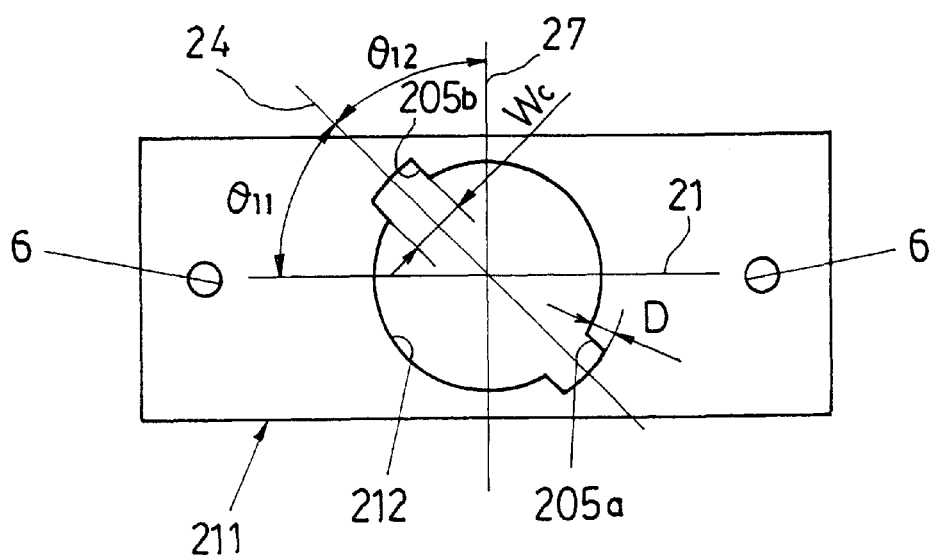
FIG. 24 is a plan view showing the construction of a stator having a pair of recesses serving as conventional holding torque setting means like FIG. 23.

With the experiment, the stator 211 with a pair of recesses 205a, 205b as shown in FIG. 24 is used, and a plurality of stators 211 are prepared wherein each width Wc of the respective recesses 205a, 205b is fixed to 400 μm, and the depths thereof are differentiated from one another, namely, they are set to 50, 100, 150 or 200 μm.

Further, a plurality of stators 211 are also prepared wherein each depth D of the respective recesses 205a, 205b is fixed to 150 μm and the widths Wc are differentiated from are another, namely, they are set to 100, 200, 300 or 400 μm.

Then, each holding torque of the step motor incorporated therein these stators 211 are subsequently measured.

The measurement result is shown in FIGS. 9 and 10.

It has been found that the maximum holding torque increases sharply as each depth D of respective recesses increases as shown in FIG. 9, and it increases gently when the depth becomes in the order of 100 μm or deeper. It has been also found that the maximum holding torque increases linearly as each width Wc of respective recesses increases as shown in FIG. 10, and it is proportional to the width Wc of the recesses.

From this result of the experiment, it has been found that the maximum holding torque is not proportional to the sum of areas of the recesses as disclosed in the literatures and the like. That is, the stator 211 used in this experiment has a pair of recesses 205a, 205b, and the sum of the areas of the recesses 205a, 205b becomes double the product of the width Wc and the depth D of one of the recesses.

Accordingly, since each width Wc of the recesses is fixed to 400 μm in the stator 211 used in the experiment as shown in FIG. 9, if the maximum holding torque is proportional to each sum of areas of the recesses, it should be proportional to the depth D of the recesses.

Meanwhile, in the measurement result shown in FIG. 9, the relation between the maximum holding torque and each depth D of the recesses is not a linear line representing the proportional relation. This measurement result represents that the maximum holding torque is not proportional to the sum of the areas of the recesses but can be set by changing each depth D of each recess in the region where each recess has a depth of 100 μm or less, and the maximum holding torque becomes substantially constant if the depth D exceeds 100 μm.

When the maximum holding torque is adjusted to be small, if the adjustment is performed by changing the depth D of the recess, the change of the maximum holding torque is large relative to the change of the depth D of the recess at the region where the depth D of the recesses is in the order of 100 μm or less, particularly at the region where the depth D is 50 μm or less, as evident from FIG. 9. Accordingly, considering the precision with which to process the stator, it is preferable not to adjust the maximum holding torque at the region where the depth D is 50 μm or less because it is difficult to set the maximum a holding torque stably.

On the other hand, as shown in FIG. 10 showing the measurement result in the case of the depth D of the recess being 150 μm, the maximum holding torque is substantially proportional to the width Wc of the recesses if the depth D of the recess is about 150 μm or more, from which it has been found that the change of the width Wc is suitable for adjusting the maximum holding torque.

In such a manner, it has been found that although the maximum holding torque does not depend on the installation angle $\theta_{12}$ as explained with reference to FIG. 24, it is determined by each of width Wc and depth D of the pair of recesses 205a, 205b.

Figure 8:
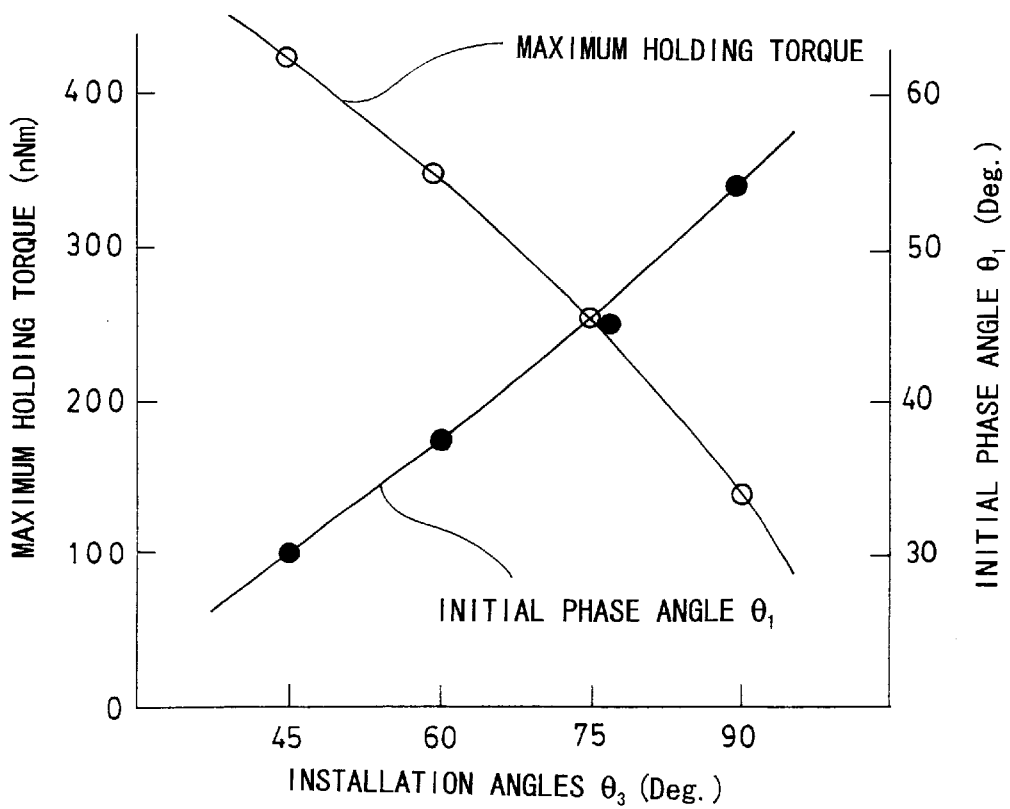
FIG. 8 is a graph showing the relation between installation angles of a pair of recesses 15e, 15f of the two-pole step motor for a timepiece in FIG. 5, a maximum holding torque and initial phase angle of the same.

Meanwhile, the measurement result of the step motor incorporating the stator 11 therein as explained with reference to FIG. 6 shows that it is different from the measurement result of the step motor incorporating therein the conventional stator 211 as shown in FIG. 8.

That is, the initial phase angle $\theta_1$ does neither conform to the installation angle $\theta_2$ of one pair of recesses 15c, 15d nor to the installation angle $\theta_3$ of another pair of recesses 15e, 15f.

Further, the maximum holding torque does not become constant at the sum value 500 nNm of double the maximum holding torque 250 nNm obtained from the pairs of the recesses 15c, 15d and the recesses 15e, 15f each. The maximum holding torque decreased from 430 nNm to 130 nNm within the range of the measurement at this time, accompanied with the increase of the setting angle $\theta_3$ of the paired recesses 15e, 15f.

Thus, in comparison of the measurement results of the step motor in which the conventional stator 211 and the stator 11 explained with reference to FIG. 6 were assembled, a totally different phenomenon was observed in the set initial phase angle and the holding torque, when the step motor using the stator 11 having the recesses 15c to 15e formed as a plurality of holding torque setting means was compared with the step motor using the conventional stator 211.

When these measurement results were examined still further, in the step motor using the stator 11 provided with two pairs of the recesses 15c, 15d and the recesses 15e, 15f being the plurality of holding torque setting means, the initial phase angle $\theta_1$ and the maximum holding torque were found to become composition of vectors of the initial phase angle $\theta_1$ and the maximum holding torque obtained when each of the holding torque setting means, namely, the pair of the recesses 15c, 15d and the pair of the recesses 15e, 15f is individually formed on the inner periphery of the rotor hole 2.

Further, since the step motor for a timepiece in the second embodiment is a two-pole step motor of which displacement angle by one step is not 360 degrees, but 180 degrees, the electrical angle of the step motor becomes double the actual angle.

Accordingly, each of the vectors corresponding to the individual holding torque setting means is given by doubling the initial phase angle $\theta_1$ and the maximum holding torque obtained when each holding torque setting means is individually provided on the inner periphery of the rotor hole 2.

Further, from the measurement results of the step motor using the conventional stator 211, the installation angles $\theta_2$ and $\theta_3$ of the two pairs of the recesses 15c, 15d and the recesses 15e, 15f serving as the holding torque setting means may be used instead of the initial phase angle $\theta_1$.

In this manner, with the step motor using the stator 11 having a plurality of holding torque setting means, the vector composition of each vectors obtained as above allows to set the initial phase angle $\theta_1$ and the maximum holding torque. And, the initial phase angle $\theta_1$ and the maximum holding torque set by the vector composition well coincided with the measurement results of the experiment made at this time.

That is, when the two holding torque setting means, the pair of the recesses 15c, 15d and the pair of the recesses 15e, 15f each are individually formed, even when the holding torque setting means each form the maximum holding torque of 250 nNm, when the installation angle $\theta_2$ of the pair of the recesses 15c, 15d is 15 degrees, the installation angle $\theta_3$ of the pair of the recesses 15e, 15f is 90 degrees, and the difference between the installation angles $\theta_2$ and $\theta_3$ is 75 degrees, the maximum holding torque becomes about 130 nNm and the initial phase angle $\theta_1$ becomes about 53 degrees from the measurement results shown in FIG. 8.

As mentioned above, according to the step motor using the stator 11 having two pairs of recesses 15c, 15d and recesses 15e, 15f of the second embodiment of the invention, it is possible to set the holding torque of a wider range and the initial phase angle $\theta_1$ by adjusting the maximum holding torque which can be set by the holding torque setting means independently of each other based on the width Wc and depth D of respective pairs of recesses 15c to 15f and the installation angles $\theta_2$, $\theta_3$ forming the positions where respective recesses 15c to 15f are formed.

As a result, when respective installation angles $\theta_2$, $\theta_3$ of the two pairs of recesses 15c, 15d and recesses 15e, 15f are adjusted and the difference between these installation angles is made large, in other word, when the difference between phase angles of each holding torque is made large, each holding torque established when forming the two pairs of recesses 15c, 15d and recesses 15e, 15f solely are large, but the entire holding torque of the step motor becomes composition of vectors of each holding torque, and hence the holding torque obtained finally can be reduced to the extremely small value.

Described next is a result of comparison obtained by an experiment for confirming a power consumption of the step motor for a timepiece in which a stator having two pairs of recesses is incorporated and that of the step motor for a timepiece in which a stator having one pair of recesses is incorporated.

Both the stator having two pairs of recesses and the stator having one pair of recesses are formed respectively so as to have the initial phase angle of about 55 degrees and the maximum value of the holding torque is about 75 nNm. A material of these stator is permalloy having a thickness of 500 $\mu$m, the diameter of the rotor hole is 1700 $\mu$m, and a samarium cobalt magnet having an outer diameter of 1000 $\mu$m and a thickness of 400 $\mu$m is used as the rotor magnet.

First, as the stator 11 having the two pairs of recesses 15c, 15d and recesses 15e, 15f, each width Wc of the respective recesses 15c to 15f (FIG. 7) is set to 400 $\mu$m, each depth D thereof is set to 150 $\mu$m while the installation angle $\theta_2$ of one pair of recesses 15c, 15d is set to 15 degrees and the installation angle $\theta_3$ of the other pair of recesses 15e, 15f is set to 96 degrees, thereby realizing a step motor having the initial phase angle $\theta_1$ of 55 degrees and the maximum holding torque of 75 nNm.

On the other hand, it has been found that the stator 211 having the conventional one pair of recesses 205a, 205b need be set such that each width Wc of respective recesses 205a, 205b is in the order of 120 $\mu$m and each depth D thereof is in the order of 150 $\mu$m, and the installation angle $\theta_{12}$ is set to be 55 degrees.

As a measuring result of power consumption of the step motors incorporating therein respectively two kinds of stators 11 and 211 while they are actually driven, it has been found that an ordinary step motor for a timepiece having the maximum holding torque of about 250 nNm shows a power consumption of about 800 to 900 nJ for one step while the step motor incorporating therein the stators 11 and 211 shows a power consumption of about 400 nJ, resulting in achieving a lower power consumption.

Further, there is no difference in characteristics between the step motors incorporating therein the stators 11 and 211.

As a result of the foregoing experiments, if the same characteristics are obtained by the step motor incorporating therein a stator having two pairs of recesses and the step motor incorporating therein a stator having one pair of recesses, with the step motor incorporating therein the stator 11 having two pairs of recesses 15c, 15d and recesses 15e, 15f, each width Wc of two pairs of recesses 15c to 15f is set to 400 $\mu$m and each depth D is set to 150 $\mu$m.

On the other hand, with the conventional step motor incorporating therein the stator 211 having one pair of recesses 205a, 205b, each width Wc of the recesses 205a, 205b is set to 120 μm and the depth D is set to 150 μm so that it can obtain the same characteristics as the step motor incorporating therein the stator having two pairs of recesses.

Accordingly, each width Wc of the respective recesses 205a, 205b should be considerably small compared with the stator 11 having two pairs of recesses.

For this, there occurs a problem in the stator 211 having one pair of recesses in view of machining and productivity.

That is, since two kinds of stators 11 and 211 used in the experiment are formed by electric discharge machining capable of processing thereof to form respective recesses with high precision so as to obtain the result of experiment with high precision, there does not occur a problem in machining the stators to form the recess to have a width of 120 μm.

However, when the stators are manufactured actually in a factory, it is necessary that they can be manufactured by press working considering a productivity. Meanwhile, it is very difficult to apply press working to a band material having a thickness of 500 μm and made of permalloy with precision to form each recess having the width of 120 μm and the depth of 150 μm on the band material. Even if such a machining is possible, a mold to be used is very short in service life, causing an extremely inferior productivity.

Even if the stators are manufactured by electric discharge machining having high precision, it takes time for machining, resulting in very expensive stators.

On the other hand, according to the stator 11 having two pairs of recesses 15c, 15d and recesses 15e, 15f as explained with reference to FIG. 6, it is possible to manufacture the step motor having the initial phase angle $\theta_1$ of 55 degrees and the maximum holding torque of 50 nNm by adjusting the installation angle $\theta_2$ of one pair of recesses 15c, 15d to 13 degrees and installation angle $\theta_3$ of the other pair of recesses 15e, 15f to 97 degrees while each width Wc of two pairs of recesses 15c to 15f is set to 400 μm and each depth D thereof is set to 150 μm.

Although the stator 11 according to the second embodiment of the invention is exemplified to have two pairs of recesses 15c, 15d and recesses 15e, 15f provided on the inner periphery of the rotor hole 2 as the holding torque setting means, the recesses serving as the holding torque setting means may be provided on the inner periphery of the rotor hole 2 by three or more pairs.

Particularly, in the case where an axle hole of gears or holes of fixing pins are formed around the rotor hole of the stator, such axle hole of gears or holes of fixing pins are prone to interfere with the recesses serving as the holding torque setting means, resulting in arising a possibility that the recesses can not be provided at the intended installation angles so as to obtain the initial phase angle and the holding torque to be set.

In such a case, each holding torque established in the case where the pair of recesses are formed at the positions to interfere with the axle hole of gears or holes of fixing pins are subjected to a vector decomposition as described above, and three or more pairs of recesses are disposed separately at the positions where they do not interfere with the axle hole of gears or the holes for fixing pins so that the positions conform to the decomposed vectors, thereby obtaining an intended initial phase angle and the holding torque.

Although typically explained in the second embodiment with reference to FIGS. 5 and 6 is a case where two pairs of recesses 15c to 15f having substantially the same dimensions and rectangular shapes are provided as two holding torque setting means on the inner periphery of the rotor hole 2, the two or more pairs of recesses may have any shape if they have openings relative to the rotor hole 2, and if they have the same shapes and dimensions as the pairing recesses, they may be changed in shapes and dimensions every pair of recesses.

Figure 11:
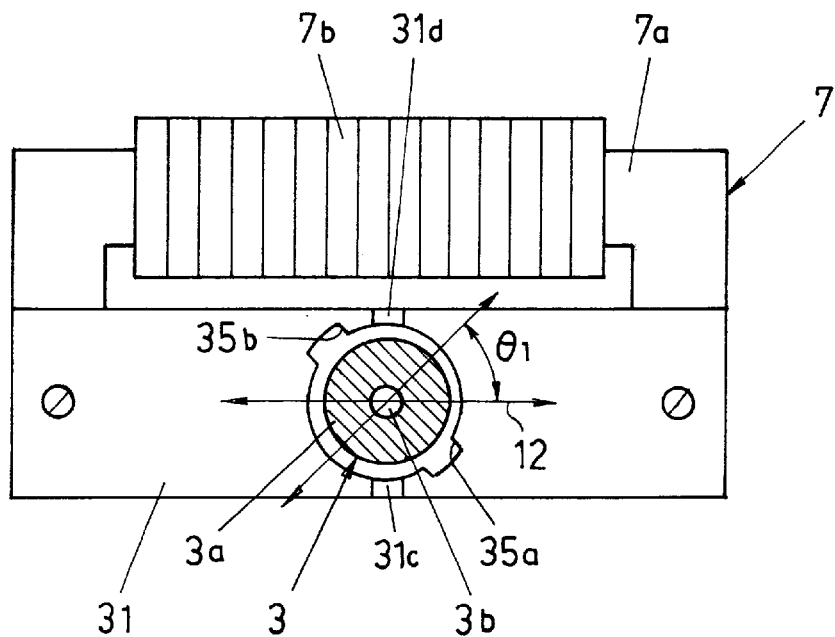
FIG. 11 is a plan view showing a schematic construction of a step motor for a timepiece according to a third embodiment of the invention like FIG. 1.
Figure 12:
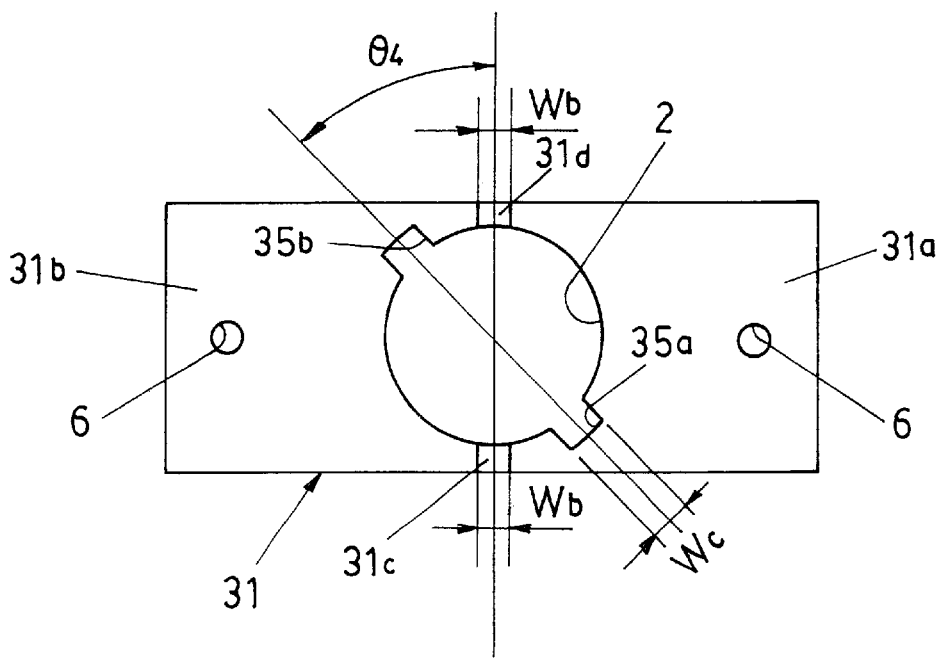
FIG. 12 is a plan view showing the construction of a stator of the step motor for a timepiece in FIG. 11.

Third Embodiment: FIGS. 11 and 12

A two-pole step motor for a timepiece according to a third embodiment of the invention is now described with reference to FIGS. 11 and 12.

FIG. 11 is a plan view of the two-pole step motor for a timepiece of the third embodiment like FIG. 1, and FIG. 12 is a plan view showing the construction of a stator of the two-pole step motor for a timepiece in FIG. 11.

The two-pole step motor for a timepiece of the third embodiment is the same as the two-pole step motor for a timepiece of the first embodiment of the invention as explained with reference FIGS. 1 to 4, except the construction of a stator, and hence the explanation of the same components is omitted.

The two-pole step motor for a timepiece according to the third embodiment of the invention as shown in FIG. 11 has connections 31c, 31d of a stator 31 forming at least one of a plurality of holding torque setting means, which is the same as the step motor shown in FIG. 1 having connections 1c, 1d of the stator 1 as explained with reference to FIG. 1, but the third embodiment is different from the first embodiment in that one pair of recesses 35a, 35b formed of substantially rectangular notches serving as holding torque setting means are formed at positions different from the positions where the connections 31c, 31d are provided on the inner periphery of a rotor hole 2 of the stator 31.

The recesses 35a, 35b are formed symmetrically with respect to the center of the rotor hole 2.

Although the installation angle of the connections 31c, 31d shown in FIG. 11 is 0 degrees, it is not always 0 degrees.

The method of manufacturing the stator 31 is the same as that of the stator 1 as explained in FIG. 2, and it is formed of a band material having a thickness of 500 μm and made of permalloy which is a high-permeability material, and press working is applied to the band material to form a pilot hole, a prepared hole for the rotor hole 2 and fixing holes 6, 6, and the band material is punched to form an outer configuration of the stator 31 while leaving a connecting portion (not shown) for connecting to the band material at a part thereof.

Subsequently, a slit is formed on the portion where the connections 31c, 31d are formed, and a wire rod made of a low-permeability material or nonmagnetic material is inserted into the slit, then the stator part 31a and stator part 31b are bonded to each other by laser welding through the intermediary of the wire rod.

Thereafter, the rotor hole 2 and the parts of the recesses 35a, 35b are punched by press working, and finally the portion to be coupled to the band material is punched, thereby completing the external shape working of the stator 31. Thereafter, the magnetic annealing is applied to the band material to make up the stator 31 of the step motor.

With the stator 31 having the forgoing construction, the connections 31c, 31d are formed such that a high permeability material are notched by press working and a low-permeability material or nonmagnetic material is bonded onto the notch by welding, hence these portions function like the holding torque setting means like a pair of recesses 35a, 35b to hold a rotor 3 at given positions.

As a result of confirming the step motor incorporating therein the stator 31, it has been found that the initial phase angle of the holding torque established by the connections 31c, 31d conforms substantially to an installation angle of the connections 31c, 31d like the pair of recesses 35a, 35b, and the magnitude of the thus established holding torque conforms substantially to a magnitude of the thus established holding torque conforms substantially to a holding torque established by the recesses of the same dimensions.

From the foregoing, even in the construction of the stator 31 like the step motor as explained with reference to FIGS. 1 to 4, a holding torque set by composition of vectors of holding torque by providing the connections 31c, 31d solely on the inner periphery of the rotor hole 2 and vectors of respective holding torque established by providing the pair or recesses 35a, 35b solely on the inner periphery of the rotor hole 2 might become finally a setting holding torque of the step motor.

An experiment to confirm this is explained hereinafter.

As the stator 31 to be used in this experiment is a stator having a pair of connections 31c, 31d and a pair of recesses 35a, 35b respectively formed on the inner periphery of the rotor hole 2 shown in FIG. 12.

An installation angle $\theta_4$ of the pair of recesses 35a, 35b shown in FIG. 12 and each width Wc of the recesses 35a, 35b are adjusted in a position where the initial phase angle $\theta_1$ (FIG. 11) becomes about 55 degrees and the maximum holding torque becomes about 75 nNm.

As a material of the stator 31, a permalloy having a thickness of 500 $\mu$m is used and a diameter of the rotor hole 2 is set to 1700 $\mu$m. Further, as the rotor magnet 3a, a samarium cobalt magnet having an outer diameter of 1000 $\mu$m and a thickness of 400 $\mu$m is used.

As a measurement result of the initial phase angle $\theta_1$ and holding torque of the stator 31 formed as such and incorporated in the step motor for a timepiece , each width Wc of the pair of recesses 35a, 35b is set to 270 $\mu$m and each depth D thereof is set to 150 $\mu$m (refer to FIG. 7), and the installation angle $\theta_4$ of the pair of recesses 35a, 35b is set to 78 degrees, so that a step motor having the initial phase angle $\theta_1$ of about 55 degrees and the maximum holding The result of experiment shows that the holding torque of the step motor is set by composition of vector of a holding torque established by the connections 31c, 31d and the vector of a holding torque established by the pair of recesses 35a, 35b provided on the inner periphery of the rotor hole 2.

If the stator 31 of the third embodiment of the invention is used as set forth above, since each width Wc of the recesses 35a, 35b is set to 270 $\mu$m to realize a step motor having the initial phase angle $\theta_1$ of about 55 degrees and the maximum holding torque of about 75 nNm, it can enlarge each width of the recesses remarkably compared with each width Wc of 120 $\mu$m in the recesses of the conventional stator 211. Accordingly, the stator 31 can be processed with ease.

Further, if the stator 31 is used, there is an advantage that each width Wc of the pair of recesses 35a, 35b can be widened by widening each width Wb of the connections 31c, 31d.

For example, although the foregoing stator 31 used the connections 31c, 31d having a width Wb of 200 $\mu$m, if the width Wb is set to wider value, i. e., 400 $\mu$m, sizes of the recesses 35a, 35b necessary for setting the initial phase angle $\theta_1$ to about 55 degrees and the maximum holding torque to about 75 nNm are preferably that each width Wc of the recesses is set to 450 $\mu$m, each depth D is set to 150 $\mu$m, and the installation angle $\theta_4$ is set to 83 degrees.

That is, when setting the same initial phase angle $\theta_1$ and holding torque, if each width Wb of connections is widened from 200 $\mu$m to 400 $\mu$m, each width Wc of the recesses 35a, 35b can be widened from 270 $\mu$m to 450 $\mu$m.

If each width Wb of the connections 31c, 31d of the stator 31 is set to 400 $\mu$m, and the installation angle $\theta_4$ of the pair of recesses 35a, 35b is set to 85 degrees, and each width Wc of the recesses is set to 430 $\mu$m, the initial phase angle $\theta_1$ can be set to 55 degrees and the maximum holding torque can be set to 50 nNm like the foregoing second embodiment.

Described next is a measurement result of a power consumption for one step when the step motor for a timepiece incorporated therein the stator 31 is actually driven.

The measurement result of the power consumption of the step motor incorporated therein the stator 31 for one step was about 350 nJ. This value is considerably small power consumption compared with a power consumption of 800 to 900 nJ for one step of an ordinary step motor for a timepiece having the maximum holding torque of about 250 nNm.

Achievement of lowering power consumption of about 350 nJ for one step of the step motor of the third embodiment is aimed by 50 nJ compared with the power consumption of about 400 nJ of the step motor for a timepiece using the stator 11 of the second embodiment of the invention in which the same holding torque is set.

This is considered to be caused by the function of the nonmagnetic connections 31c, 31d in the construction of the stator 31.

As set forth above, if the stator 31 according to the third embodiment of the invention is used, it is possible to set an extremely small holding torque suitable for achieving of lowering power consumption without impairing a productivity like the stator 11 of the second embodiment of the invention.

Although explained with reference to FIGS. 11 and 12 in the third embodiment is the case where the pair of recesses 35a, 35b are formed on the inner periphery of the rotor hole 2 other than the connections 31c, 31d serving as the holding torque setting means, the number of recess to be formed on the inner periphery of the rotor hole 2 may be two pairs or more.

The shapes of the recesses 35a, 35b formed on the inner periphery of the rotor hole 2 are not limited to substantially rectangular shapes of the pair of recesses as shown in FIG. 12, but they may have any shape if they have openings relative to the rotor hole 2 suppose they have the same shapes and dimensions as the pair of recesses.

Figure 13:
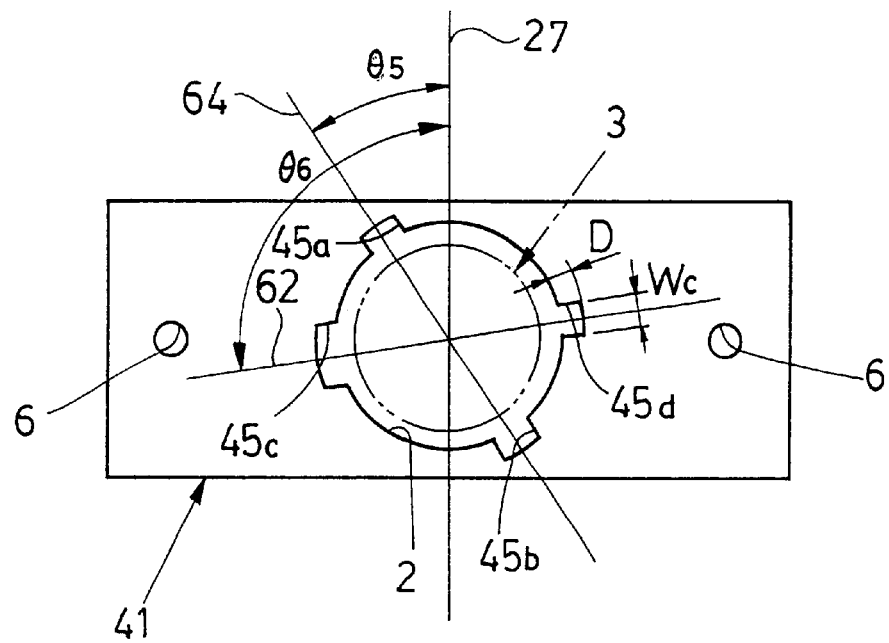
FIG. 13 is a plan view showing a schematic construction of a step motor for a timepiece according to a fourth embodiment of the invention like FIG. 6.

Fourth Embodiment: FIG. 13

A two-pole step motor for a timepiece according to a fourth embodiment of the invention is described with reference to FIG. 13.

FIG. 13 is a plan view like FIG. 6 showing the construction of a stator of a two-pole step motor for a timepiece according to the fourth embodiment of the invention.

The two-pole step motor for a timepiece according to the fourth embodiment of the invention is the same as that of the second embodiment explained with reference to FIGS. 5 and 6 except the construction of a stator, and hence the same components are omitted to explain.

Although a stator 41 shown in FIG. 13 has a plurality of holding torque setting means for holding a rotor 3 at given positions in the rotary direction, the plurality of holding torque setting means include holding torque setting means having an asymmetrical shape with respect to the center of the rotor hole 2. That is, in the stator 41, one pair of recesses 45a, 45b and another pair of recesses 45c, 45d are formed on an inner periphery of the rotor hole 2 serving as holding torque setting means for establishing a holding torque and an initial phase angle of the rotor 3.

The recesses 45a, 45b are disposed symmetrically relative to the center of the rotor hole 2. Likewise, the recesses 45c, 45d are disposed symmetrically with respect to the center of the rotor hole 2.

Although the recesses 45a, 45b have the same shape as is evident from FIG. 13, the recesses 45c, 45d have not the same shape, wherein a width Wc of the recess 45c is larger than that of the recess 45d.

An angle formed by a straight line 27 passing through the center of the rotor hole 2 and orthogonal to an excitation direction line (a magnetic filed directed line 12 in FIG. 5) and a straight line 64 passing through the centers of the pair of recesses 45a, 45b is defined as an installation angle $\theta_5$ of the recesses 45a, 45b. Likewise, an angle formed by a straight line 62 passing through the centers of the recesses 45c, 45d and the straight line 27 is defined as a installation angle $\theta_6$ of the recesses 45c, 45d. The installation angles $\theta_5$, $\theta_6$ have a positive value in counterclockwise direction.

Meanwhile, in the stator 11 shown in FIG. 6, the holding torque setting means comprises two pairs of recesses 15c to 15f, and the holding torque and initial phase angle formed by the paired recesses are represented by vectors every paired recesses, and the maximum holding torque that is set as a consequence becomes the sum of these vectors.

Since all the respective recesses 15c to 15f have the same shapes and same sizes, two vectors of each pair of recesses have the same magnitude, while the phase angles are determined based on installation angles $\theta_2$, $\theta_3$ of each pair of recesses.

On the other hand, in the stator 41 of the fourth embodiment of the invention, one pair of recesses 45a, 45b and another pair of recesses 45c, 45d correspond to respective vectors each having a holding function, and composition of holding functions of two pairs of recesses 45a to 45d becomes composition of these vectors.

Here, stators, namely, one having a pair of recesses, and others having a pair of recesses which are not the same in size have been manufactured and an experiment was peformred for checking each holding torque of the testers.

The stator used in this experiment having the same dimensions of the recesses has each width Wc of the recesses set to 400 $\mu$m in accordance with the experiment that was performed when obtaining the experimental data as shown in FIG. 8. The stators having different dimensions have a combination of the width Wc of recesses set to 450 $\mu$m and 350 $\mu$m and another combination of the width Wc of the recesses set to 500 $\mu$m and 300 $\mu$m so that the sum of the width in each combination becomes 800 $\mu$m.

Each depth D of the recesses is set to 150 $\mu$m. An experiment of the step motor incorporating these stators built therein shows that a holding torque and an initial phase angle of the rotor conform each other within a measurement error.

It has been confirmed in the experiment that even if the shape of the recesses (same in the case of protuberances) is asymmetrical, if the sum of each width Wc of two recesses is fixed, the holding torque and initial phase angle of the rotor can be kept constant.

Accordingly, although there is a difference in size between respective areas of the pair of recesses 45c, 45d in the case of the stator 41 shown in FIG. 13, when the areas of the recesses are changed under the condition that each depth D of the recess is fixed and each width Wc thereof is changed, if the sum of the areas of a pair of recesses is fixed, a vector is basically the same, and asymmetrical recesses do not affect the vector.

Accordingly, by adjusting the sum of areas of a plurality of paired recesses, the vectors can be adjusted, while when the vectors, i.e., the sum of the areas of the recesses, is fixed, the areas of a plurality of paired recesses can be allotted to adjust thereof.

In the case of the stator 41 shown in FIG. 13, one pair of recesses 45c, 45d are differentiated in a size to differentiate in an area, but not only one pair of recesses 45c, 45d but also the other pair of recesses 45a, 45b can be differentiated in a size to differentiate in an area.

In such a manner, the allocation of areas of the pair of recesses 45c, 45d and the selection of the installation angle $\theta_5$ of the pair of recesses 45a, 45b and installation angle $\theta_6$ of the pair of recesses 45c, 45d increase the degree of freedom for disposing the recesses compared with the conventional case where the paired recesses have the same shape. Accordingly, the holding torque or initial phase angle can be set more conveniently.

Figure 14:
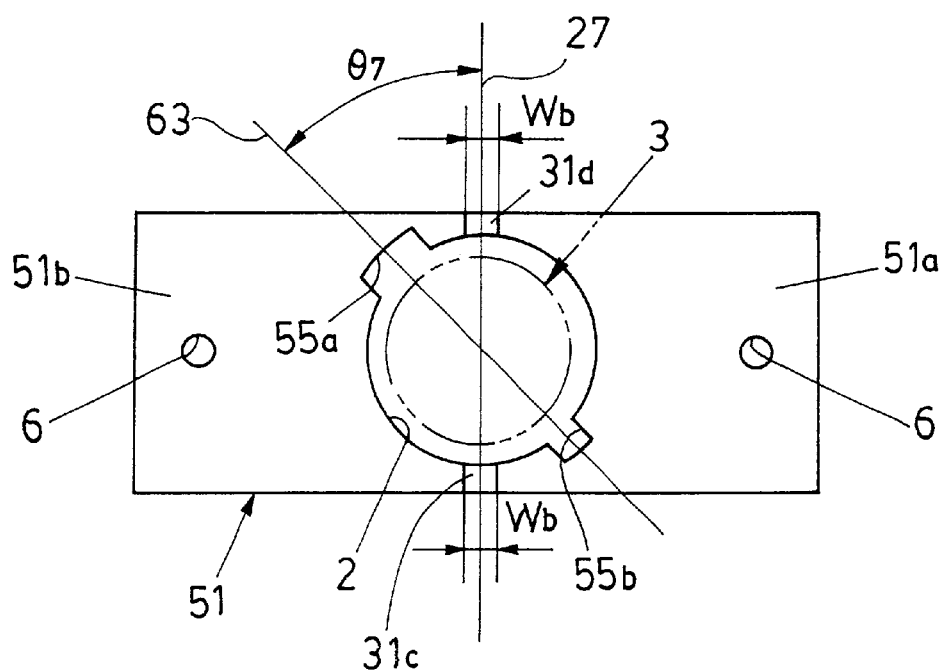
FIG. 14 is a plan view showing the construction of a stator of the step motor for a timepiece according to a fifth embodiment of the invention like FIG. 12.

Fifth Embodiment: FIG. 14

A two-pole step motor for a timepiece according to a fifth embodiment of the invention is now described with reference to FIG. 14.

FIG. 14 is a plan view showing the construction of a stator of the two-pole step motor for a timepiece according to the fifth embodiment of the invention like FIG. 12, and the components corresponding to those in FIG. 12 are depicted by the same reference numerals.

In a stator 51 used in the two-pole step motor for a timepiece according to the fifth embodiment, the shape of the recess 55a side is made larger than the recess 55b side among the pair of recesses 55a and 55b which are formed on the inner periphery on the rotor hole 2 symmetrically with respect to the center of the rotor hole 2 compared with the stator 31 as explained with reference to FIG. 12.

The first and second stator parts 51a, 51b made of respectively high-permeability material are integrally connected to each other through the intermediary of connections 31c, 31d made of low-permeability material or nonmagnetic material by welding, wherein the connections 31c, 31d operate in the same manner as the pairs of recesses 55a, 55b to function as the holding torque setting means.

Accordingly, it is considered that the stator 51 has substantially two pairs of recesses, so that the maximum holding torque and the initial phase angle produced in the rotor 3 become a sum of a vector corresponding to a holding torque established by the pair of recesses 55a, 55b and a vector corresponding to a holding torque established by the connections 31c, 31d.

In the case the stator 51 is adopted, the restriction for making the recesses 55a, 55b same in size is removed so that the recesses 55a, 55b can be disposed with ease. Further, a holding torque and an initial phase angle of the rotor 3 can be set extremely freely by merely selecting an installation angle $\theta_7$ formed by a central line 63 passing through the recesses 55a, 55b relative to a straight line 27 passing through the centers of the connections 31c, 31d.

With the stator 51 shown in FIG. 14, suppose an angle formed by a straight line passing through the centers of the connections 31c, 31d (conforming to the straight line 27 in this case) and the straight line 27 passing through the center of the rotor hole 2 and orthogonal to a straight line in the excitation direction of the stator 51 is an installation angle of the connections 31c, 31d, the installation angle becomes 0 degree. However, the installation angle may be other than 0 degree and the connections 31c, 31d may be formed in a tilted position.

Further, a width Wb of the connection 31c may be differentiated from a width Wb of the connection 31d. In such a case, the characteristics of the step motor can be more freely set.

An experiment is performed for checking a holding torque in the case where one of paired recesses is formed, namely, only one recess is formed on the inner periphery of the hole as an extreme case of the holding torque setting means having different shapes from those of the foregoing paired recesses (a case of protuberance, described later, is the same).

According to the result of the experiment, even if there is provided only one recess, a holding torque is set in the same manner as a holding torque is set by a pair of recesses. It has been found that one vector representing the maximum holding torque and initial phase angle corresponds to one recess, and if a plurality of recesses are formed, vectors corresponding thereto become composition of respective vectors in whole.

It has been found from this experiment that as a base of holding torque setting means, it does not necessarily follow that the holding torque setting means is provided on the paired recesses, but even if a sole recess which is not paired may be disposed on the inner periphery of the rotor hole at a desired position, desired characteristics can be obtained.

Meanwhile, if two holding torque setting means are provided symmetrically with respect to the center of the rotor hole, theoretically the rotor receives only a holding torque from the stator, and hence there does not produce a side pressure at the bearing side.

However, a side pressure is produced in the rotor as two holding torque setting means are displaced to a position where they become asymmetrical with respect to the center of the hole. The side pressure is most intense when a sole recess serving as holding torque setting means is formed, and friction on the bearing part increases by the side pressure. Accordingly, a current for driving the motor is prone to slightly increase to oppose the production of the friction. However, there are many cases where several holding torque setting means are combined with one another and disposed in a practical use. In such a case, the side pressure will be offset, and hence a current for driving the rotor does not increase much finally.

From the above experiment, it has been found that one vector representing the holding torque and initial phase angle is present relative to one recess, and the vector when a plurality of sole recesses are formed without paired becomes composition of these vectors.

Accordingly, recesses formed on the inner periphery of the hole as the holding torque setting means are not always to be paired. That is, a sole recess which is not paired forms a basic unit of the holding torque setting means and such a recess may be disposed on the inner periphery of the hole by necessary number.

Figure 15:
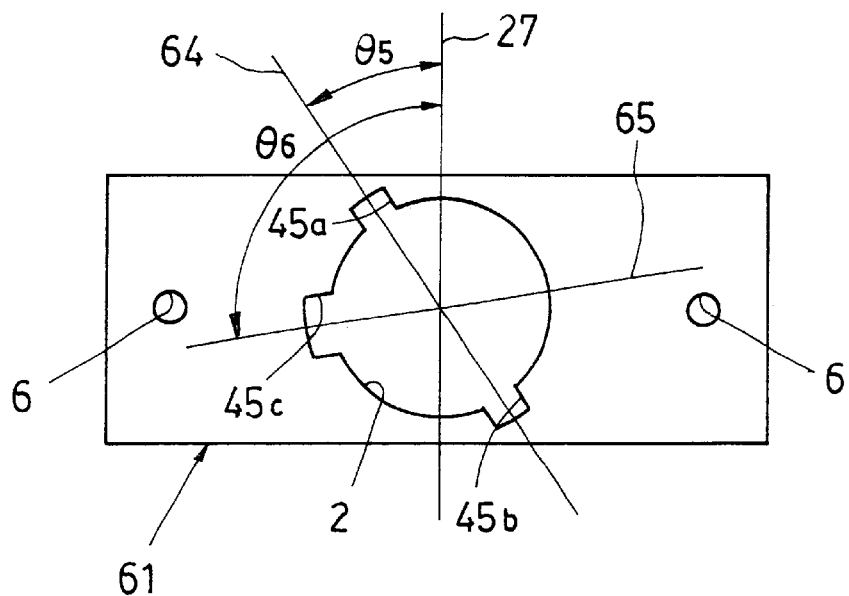
FIG. 15 is a plan view showing the construction of a stator of the step motor for a timepiece according to a sixth embodiment of the invention like FIG. 13.

Sixth Embodiment: FIG. 15

A two-pole step motor for a timepiece according to a sixth embodiment of the invention is described now with reference to FIG. 15.

FIG. 15 is a plan view showing the construction of a stator of the two-pole step motor for a timepiece according to the sixth embodiment of the invention like FIG. 13, and the components corresponding to FIG. 13 are depicted by the same reference numerals.

With a stator 61 used by the two-pole step motor for a timepiece according to the sixth embodiment of the invention, a pair of recesses 45a, 45b are formed on the inner periphery of a rotor hole 2 at a position where a straight line 64 passing through the centers of the recesses 45a, 45b forms an installation angle $\theta_5$ relative to a straight line 27, and a sole recess 45c which is not paired is formed at a position where a straight line 65 passing through the center of the recess 45c forms an installation angle $\theta_6$ relative to the straight line 27.

The holding torque set by the stator 61 becomes composition of a vector corresponding to a holding torque established by a pair of recesses 45a, 45b and a vector corresponding to a holding torque established in the sole recess 45c.

As mentioned above, the holding torque setting means is not limited to a combination of paired recesses, and even if the sole recess is disposed at various positions, desired characteristics can be obtained.

Figure 16:
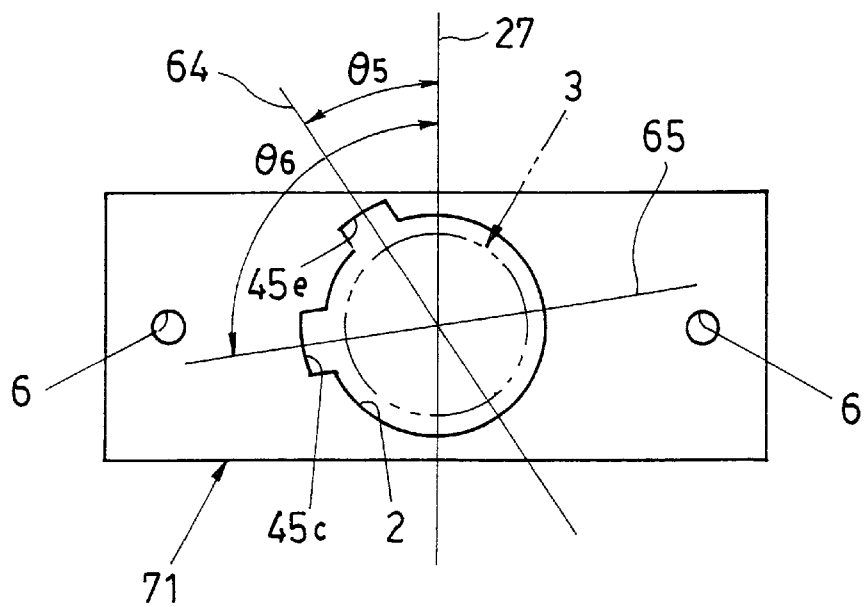
FIG. 16 is a plan view showing the construction of a stator of the step motor for a timepiece according to a seventh embodiment of the invention like FIG. 15.

Seventh Embodiment: FIG. 16

A two-pole step motor for a timepiece according to a seventh embodiment of the invention is described now with reference to FIG. 16.

FIG. 16 is a plan view showing the construction of a stator of the two-pole step motor for a timepiece according to the seventh embodiment of the invention like FIG. 15, and the components corresponding to FIG. 15 are depicted by the same reference numerals.

A stator 71 used in the two-pole step motor for a timepiece according to the seventh embodiment of the invention has recesses 45c, 45e at two positions on the inner periphery of the rotor hole 2 and these recesses 45c, 45e are neither paired nor symmetrically provided with respect to the center of the rotor hole 2 but each of them is a sole recess. A straight line 65 passing through the center of the recess 45c forms an installation angle $\theta_6$ relative to a straight line 27 while a straight line 64 passing through the center of the recess 45e forms an installation angle $\theta_5$ relative to the straight line 27.

With the stator 71, a state of holding the rotor 3 is determined by composition of vectors of respective recesses 45c, 45e for holding the rotor 3.

Figure 17:
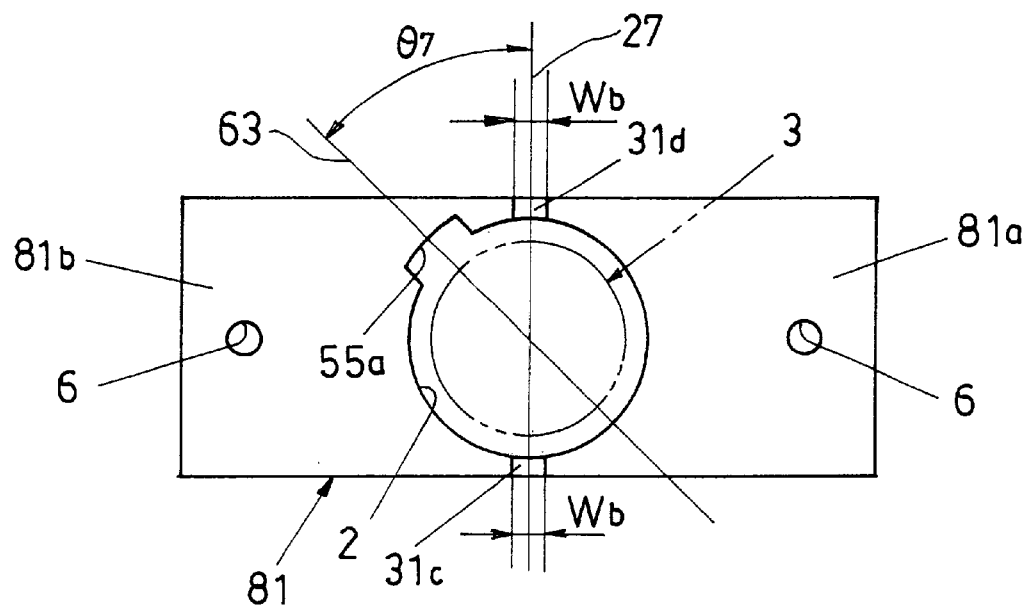
FIG. 17 is a plan view showing the construction of a stator of the step motor for a timepiece according to an eighth embodiment of the invention like FIG. 14.

Eighth Embodiment: FIG. 17

A two-pole step motor for a timepiece according to an eighth embodiment of the invention is described now with reference to FIG. 17.

FIG. 17 is a plan view showing the construction of a stator of the two-pole step motor for a timepiece according to the eighth embodiment of the invention like FIG. 14, and the components corresponding to FIG. 14 are depicted by the same reference numerals.

A stator 81 used in the two-pole step motor for a timepiece according to the eighth embodiment of the invention comprises first and second stator parts 81a, 81b made of high-permeability material respectively which integrally connected to each other by welding through the intermediary of a pair of connections 31c, 31d made of low-permeability material or nonmagnetic material each having a width Wb.

A sole recess 55a is formed on the inner periphery of a rotor hole 2 and a straight line 63 passing through the center of the recess 55a forms an installation angle $\theta_7$ relative to a straight line 27.

Also in the stator 81, likewise the stator 51 as explained with reference to FIG. 14, the pair of connections 31c, 31d operate like paired recesses and have vectors for holding rotor. Since the sole recess 55a also has a vector, a holding torque and an initial phase angle of the rotor 3 are determined by composition of these vectors.

Also in the stator 81 shown in FIG. 17, a straight line passing through the centers of the connections 31c, 31d is superimposed on a straight line 27, so that the installation angle of the connections 31c, 31d becomes 0 degree in the same manner as the stator 51 shown in FIG. 14, but the installation angle may be set to an angle other than 0 degree and the connections 31c, 31d may be tilted in the same manner as the case of the stator 51 as explained above.

Further, the width Wb of the connections 31c, 31d may be differentiated from each other. Still further, the centers of the connections 31c, 31d may not be positioned on the same straight line.

Figure 18:
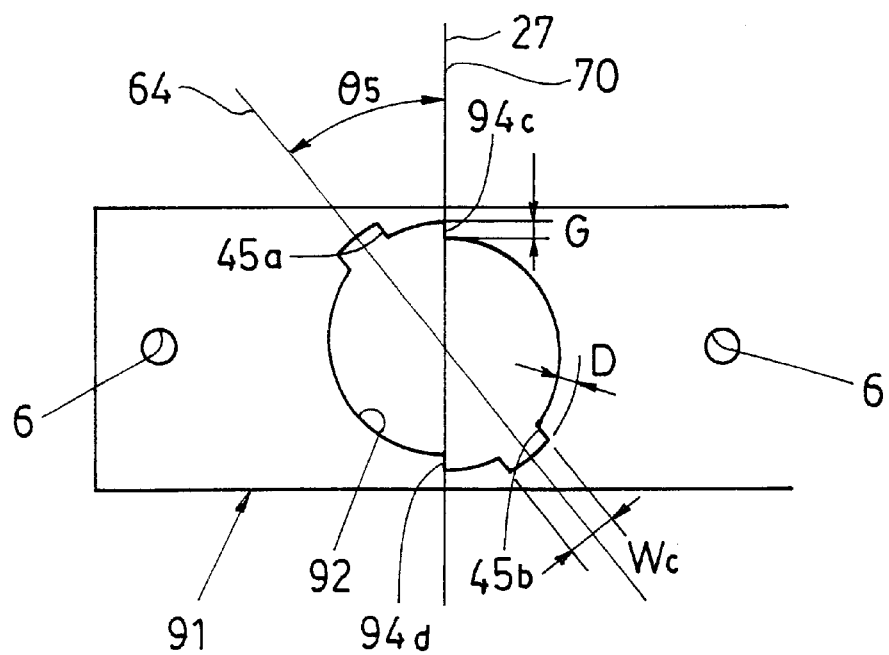
FIG. 18 is a plan view showing the construction of a stator of the step motor for a timepiece according to a ninth embodiment of the invention like FIG. 15.

Ninth Embodiment: FIG. 18

A two-pole step motor for a timepiece according to a ninth embodiment of the invention is described now with reference to FIG. 18.

FIG. 18 is a plan view showing the construction of a stator of the two-pole step motor for a timepiece according to the ninth embodiment of the invention like FIG. 15, and the components corresponding to FIG. 15 are depicted by the same reference numerals.

A stator 91 used in the two-pole step motor for a timepiece according to the ninth embodiment of the invention comprises different types of holding torque setting means, namely, gap type and notched type holding torque setting means.

That is, in the stator 91, stepped parts 94c, 94d each having a gap amount G serving as the gap type holding torque setting means and a pair of recesses 45a, 45b serving as notched type holding torque setting means are respectively provided in a rotor hole 92.

With the step motor using the stator 91, a holding torque and initial phase angle of the rotor are determined by composition of a vector corresponding to holding torque established by the stepped parts 94c, 94d and a vector corresponding to holding torque established by the pair of recesses 45a, 45b.

Figure 23:
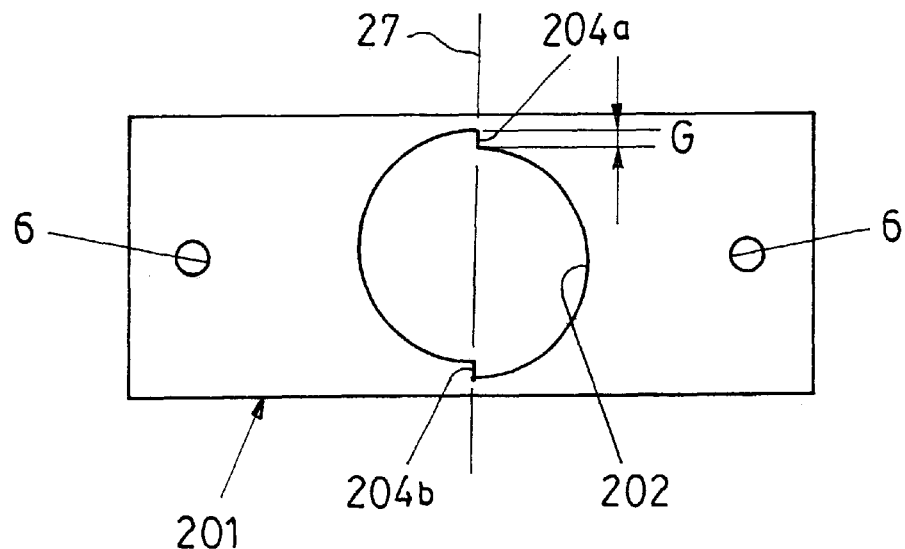
FIG. 23 is a plan view showing the construction of a stator of the step motor for a timepiece like FIG. 2.

Meanwhile, in a simple gap type stator as shown in the conventional stator 201 shown in FIG. 23, suppose a diameter of the hole is about 1700 µm on average and a gap amount G is 40 µm, the maximum holding torque of the rotor becomes about 300 nNm and an initial phase angle becomes about 45 degrees.

However, as a result of experiment made by the inventors, an optimum initial phase angle of the rotor (refer to $\theta_1$ in FIG. 22) for enhancing an efficiency of the step motor to lower a power consumption is larger than 45 degrees, more particularly, it ranges from 50 to 60 degrees, but it may be up to 70 degrees which does not cause any problem in practical use.

Whereupon if the stepped parts 204a, 204b are provided at the position where they are, e. g., rotated 20 degrees counterclockwise from a position on the straight line 27 orthogonal to its longitudinal direction of a stator 201 as viewed in FIG. 23, the initial phase angle can be approached to the foregoing ideal angles of 50 to 60 degrees.

However, if the maximum holding torque is intended to be reduced to achieve further lowering of power consumption, the gap amount G need be extremely small value. Accordingly, working for that becomes difficult to be performed.

Meanwhile, if the stator 91 as explained with reference to FIG. 18 is used, it can reduce the maximum holding torque and obtain an appropriate initial phase angle without reducing the gap amount G and the dimensions of the recesses 45a, 45b to an extremely small value by appropriately selecting the installation angle $\theta_5$ of the recesses 45a, 45b because the stator 91 has the gap type holding torque setting means established by stepped parts 94c, 94d and the notched type holding torque setting means established by a pair of recesses 45a, 45b.

On the other hand, with the stator 91 shown in FIG. 18, since a straight line 70 passing through the stepped parts 94c, 94d is superimposed on a straight line 27 orthogonal to an excitation direction of the stator 91, the installation angles of the stepped parts 94c, 94d are 0 degree while the pair of recesses 45a, 45b form an installation angle $\theta_5$ between a straight line 64 passing through the centers thereof relative to the straight line 27, but the stepped parts 94c, 94d may be provided at an installation angle other than 0 degree in a position where the straight line 70 passing through the stepped parts 94c, 94d is tilted relative to the straight line 27.

According to a result of experiment performed by the inventors, it is confirmed that with the stator 91 having a gap amount G of the stepped parts being 40 µm, each width Wc of the recesses being 400 µm, each depth D being 150 µm, the maximum holding torque is 75 nNm and the initial phase angle is 55 degrees where an installation angle of the straight line 70 passing through the stepped parts 94c, 94d relative to the straight line 27 is 75 degree and an installation angle $\theta_5$ of the recesses 45a, 45b is –10 degree.

Alternatively, when the installation angle of the stepped parts 94c, 94d is set to 63 degrees and the installation angle of the recesses 45a, 45b is set to –25 degrees, it is confirmed that the maximum holding torque becomes 50 nNm and the initial phase angle becomes 55 degrees.

Figure 19:
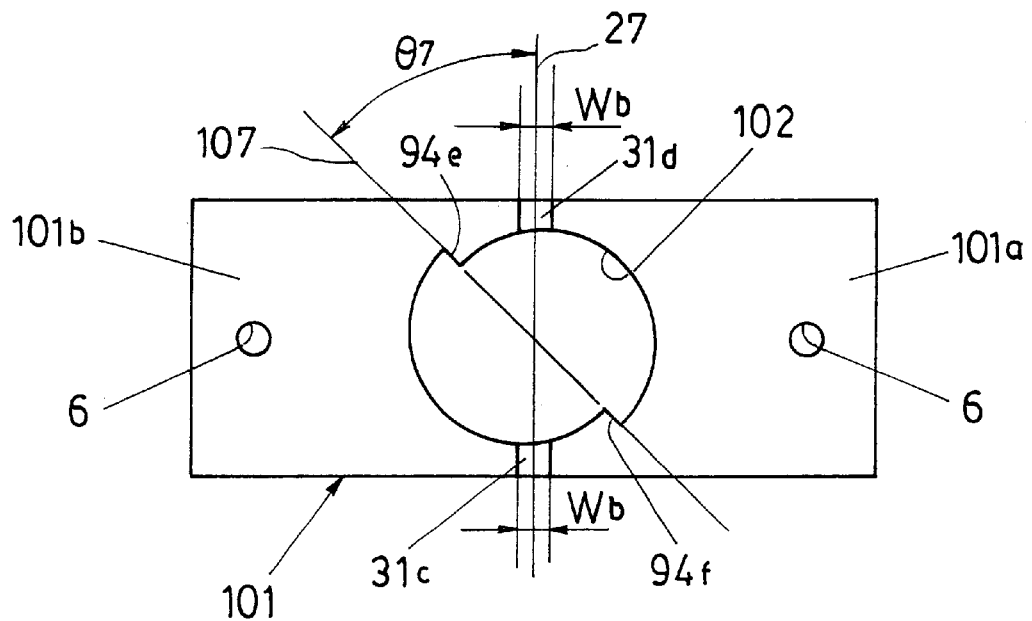
FIG. 19 is a plan view showing the construction of a stator of the step motor for a timepiece according to a tenth embodiment of the invention like FIG. 17.

Tenth Embodiment: FIG. 19

A two-pole step motor for a timepiece according to a tenth embodiment of the invention is described now with reference to FIG. 19.

FIG. 19 is a plan view showing the construction of a stator of the two-pole step motor for a timepiece according to the tenth embodiment of the invention like FIG. 17, and the components corresponding to FIG. 17 are depicted by the same reference numerals.

A stator 101 used in the two-pole step motor for a timepiece according to the tenth embodiment of the invention has a construction comprising first and second stator parts 101a, 101b made of a high-permeability material respectively and integrated with each other by welding through the intermediary of connections 31c, 31d made of a low-permeability material or nonmagnetic material each having a width Wb.

A gap type rotor hole 102 is defined in the stator 101 and it has stepped parts 94e, 94f.

A straight line passing through the centers of the connections 31c, 31d is superimposed on a straight line 27 orthogonal to an excitation direction of the stator 101 while a straight line 107 passing through the stepped parts 94e, 94f is set to a position tilted at an installation angle $\theta_7$ relative to the straight line 27.

A stator having the stepped parts 94e, 94f are disposed at a position to set the installation angle $\theta_7$ to 0 degrees by superimposing the straight line 107 passing through the stepped parts 94e, 94f shown in FIG. 19 on the straight line 27 so that the stepped parts 94e, 94f are positioned to conform to the connections 31c, 31d made of a low-permeability material or nonmagnetic material, is already known.

In the case of such a known stator, an initial phase angle caused by the action of only the stepped parts of the rotor is substantially about 45 degrees as mentioned above, and the addition of action of connections in the same manner as a pair of recesses renders the initial phase angle of the rotor determined by composition of vectors (refer to $\theta_1$ in FIG. 22) to reduce to 30 to 40 degrees.

It is preferable that the initial phase angle ranges from 50 to 60 degrees, as mentioned above, to achieve lowering of power consumption, but with the conventional construction having the stepped parts which conform to the positions of the connections can not achieve such lowering power consumption.

However, according to the stator 101 shown in FIG. 19, since the straight line 107 passing through the stepped parts 94e, 94f are positioned at a position where it is rotated counterclockwise (positive direction) at installation angle $\theta_7$ relative to the straight line 27 passing through the centers of the paired connections 31c, 31d, thereby obtaining the initial phase angle ranging from 50 to 70 degrees that is effective for achieving lowering of power consumption of the step motor.

The stator 101 also can obtain the preferable maximum holding torque and the initial phase angle of the rotor by composition of vectors acting on the rotor by the paired connections 31c, 31d and the paired stepped parts 94e, 94f.

Figure 20:
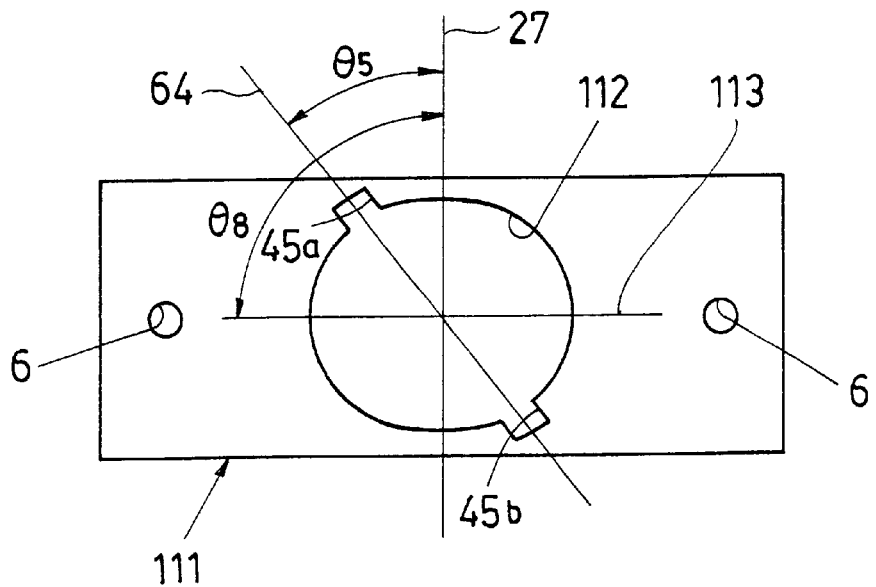
FIG. 20 is a plan view showing the construction of a stator of the step motor for a timepiece according to an eleventh embodiment of the invention like FIG. 18.

Eleventh Embodiment: FIG. 20

A two-pole step motor for a timepiece according to an eleventh embodiment of the invention is described now with reference to FIG. 20.

FIG. 20 is a plan view showing the construction of a stator of the two-pole step motor for a timepiece according to the eleventh embodiment of the invention like FIG. 18, and the components corresponding to FIG. 18 are depicted by the same reference numerals.

A stator 111 used in the two-pole step motor for a timepiece according to the eleventh embodiment of the invention has two kinds of holding torque setting means, namely, an oval type means and a notched type means which are different in system.

That is, a rotor hole 112 provided in the stator 111 is formed in not true circular shape but in an oval shape such as an egg shape, an ellipse, an oblong shape, or the like, and the rotor hole 112 per se functions as one of the holding torque setting means.

A pair of recesses 45a, 45b are formed on the inner periphery of the rotor hole 112 that serve as notched type holding torque setting means.

The rotor hole 112 is not true circular as set forth above. Accordingly, when the rotor hole 112 is true circular, the rotor disposed inside the rotor hole 112 is not fixed at its stopping position when the step motor is not operated but when the rotor hole 112 is oval, a holding torque for stopping the rotor is established. Accordingly, the oval rotor hole 112 functions as one of holding torque setting means.

With the stator 111, a straight line 64 passing through the centers of the recesses 45a, 45b has an installation angle $\theta_5$ relative to a straight line 27 orthogonal to an excitation direction while a long axle 113 of the oval rotor hole 112 has an installation angle $\theta_8$ relative to the straight line 27.

With the step motor using the stator 111, the holding torque and initial phase angle are set by composition of a vector corresponding to holding torque established by a pair of recesses 45a, 45b and a vector corresponding to a holding torque established by the oval shape of the rotor hole 112.

FIG. 20 shows exaggeratingly an oval shape of the rotor hole 112, but the actual dimensions are such that a difference between the long axle and the short axle is about 40 μm relative to the diameter of the rotor hole 112 of 1700 μm on average.

Figure 21:
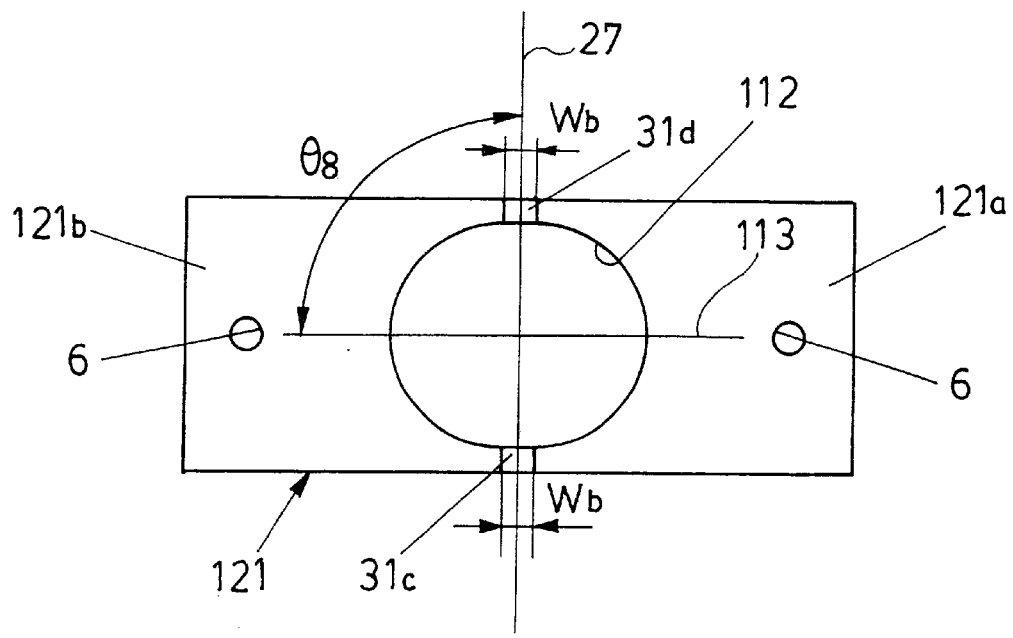
FIG. 21 is a plan view showing the construction of a stator of the step motor for a timepiece according to a twelfth embodiment of the invention like FIG. 20.

Twelfth Embodiment: FIG. 21

A two-pole step motor for a timepiece according to a twelfth embodiment of the invention is described now with reference to FIG. 21.

FIG. 21 is a plan view showing the construction of a stator of the two-pole step motor for a timepiece according to the twelfth embodiment of the invention like FIG. 20, and the components corresponding to FIGS. 19 and 20 are depicted by the same reference numerals.

A stator 121 used in the two-pole step motor for a timepiece according to the twelfth embodiment of the invention has a construction of the combination of connections 31c, 31d made of a low-permeability material or nonmagnetic material and an oval type rotor hole 112.

That is, first and second stator parts 121a, 121b made of a high-permeability material respectively are integrated with each other by welding through the intermediary of connections 31c, 31d each having a width Wb, thereby making up the stator 121. The oval rotor hole 112 is formed in the stator 121.

With the stator 121, although a straight line passing through the centers of the connections 31c, 31d is superimposed on a straight line 27 orthogonal to an excitation direction, an oval long axle 113 is positioned at an installation angle $\theta_8$ relative to the straight line 27.

With the stator 121, the connections 31c, 31d have the same effect as a pair of recesses as set forth in other embodiments of the invention, and the stator 121 is considered, in a wider sense, as a kind of combination of an oval type and a notched type holding torque setting means.

Accordingly, the holding torque and initial phase angle of the rotor are set by composition of a vector corresponding to the holding torque established by the pair of connections 31c, 31d and a vector corresponding to a holding torque established by the oval rotor hole 112.

Other Modifications

Although the two-pole step motor for a timepiece according to various embodiments of the invention has been described hereinbefore, the recesses are formed inside of the rotor hole serving as the holding torque setting means among the embodiments of the invention. Protuberances may be formed inside the rotor hole instead of the recesses, and they may function as holding torque setting means.

If such protuberances are formed, a holding torque is determined by each width and each height of the protuberances while it is determined by each width (Wc in FIG. 7) of the recesses in the case of the recesses.

However, when protuberances are formed inside the rotor hole, a dispersion is prone to occur in a holding torque because particularly each height of the protuberances is strongly susceptible to precision with which to process the stator. Accordingly, when manufacturing a stator by press working, the employment of recesses is preferable for setting a holding torque with precision compared with the employment of the protuberances in view of the precision of dimensions of molds.

When the holding torque setting means is formed of recesses, the installation angle of the holding torque setting means and the direction of the magnetic poles of a rotor magnet when it is in a standstill are different from each other. However, when the holding torque setting means is formed of protuberances, the installation angle of the holding torque setting means and the direction of the magnetic poles of a rotor magnet when it is in a standstill conform to each other.

If a plurality of protuberances serving as holding torque setting means

If a plurality of protuberances serving as holding torque setting means are formed inside the rotor hole, electromechanical coupling constant increases in proportion to the sum of each width of the protuberances suppose that each height of the protuberances is fixed.

If the electromechanical coupling constant increase, it is possible to obtain the same holding torque by smaller current as evident from an expression showing a relation between an electromechanical coupling constant (nΦ) and a driving torque. As a result, a power consumption of the two-pole step motor for a timepiece can be reduced.

The expression showing the relation between the electromechanical coupling constant (nΦ) and the driving torque is represented by $$Td = n \cdot \Phi \cdot i \cdot \sin(\theta + \theta_i)$$

where Td is a dirving torque, n is the number of turns of a coil, $\Phi$ is a maximum magnetic flux interlinking with a coil, i is a current caused to flow through the coil, $\theta$ is displacement angle from a standstill position of the rotor, and $\theta_i$ is an initial phase angle.

The relation between the sum of each width of a plurality of protuberances and the electromechanical coupling constant is represented by concrete numeric values.

A table represented hereunder shows at what ratio the electromechanical coupling constant increases as the sum of each width of the protuberances increase suppose that an electromechanical coupling constant (n$\Phi$) is 1 in the case of formation of only the recesses serving as holding torque setting means.

| Sum of each Width of Protuberances ($\mu$m) | Increase Ratio of Electromechanical Coupling Constant |
|---|---|
| 0 | 1.00 |
| 400 | 1.02 |
| 600 | 1.03 |
| 800 | 1.04 |
| 1200 | 1.06 |

As mentioned above, if the protuberance are formed inside the rotor hole serving as holding torque setting means, an electromechanical coupling constant can increase when enlarging each width of the protuberances, thereby obtaining an intended driving torque with a small current. Accordingly, a power consumption of the two-pole step motor for a timepiece can be reduced.

INDUSTRIAL APPLICABILITY

As mentioned in detail above, the two-pole step motor for a timepiece of the invention can achieve lowering of power consumption by reducing a current caused to flow through a coil wound around a magnetic core and can be manufactured with ease, and hence it is expected to be utilized in a wider range as a motor for operating hands of an analog electronic timepiece such as a wrist watch or a table clock.

What is claimed is:

1. A two-pole step motor for a timepiece comprising: a stator including a high-permeability material, and having a rotor hole; a rotor, installed in the rotor hole, the rotor including a rotor magnet and a rotor axle; and a field coil for excitation, including a magnetic core comprising a high-permeability material and a conductor wound around the high-permeability material, opposite ends of the magnetic core being magnetically bonded to opposite ends of the stator;

wherein the stator includes a plurality of holding torque setting means disposed on an inner periphery of the rotor hole at installation angles differing in a direction of the inner periphery, and an initial phase angle $\theta_1$ formed by a magnetic field direction line in a direction of a magnetic field produced inside the rotor hole and a magnetizing direction line of the rotor magnet at a standstill position of the rotor based on the respective installation angles of the plurality of the holding torque setting means is in a range of 50 mechanical degrees to 70 mechanical degrees.

2. A two-pole step motor for a timepiece comprising: a stator including a high-permeability material, and having a rotor hole; a rotor, installed in the rotor hole, the rotor including a rotor magnet and a rotor axle; and a field coil for excitation, including a magnetic core comprising a high-permeability material and a conductor wound around the high-permeability material, opposite ends of the magnetic core being magnetically bonded to opposite ends of the stator;

wherein the stator comprises a plurality of holding torque setting means including a combination of different type of the holding torque setting means, and the plurality of holding torque setting means have installation angles, in a direction of an inner periphery of the rotor hole, differing from each other, and the stator is made up by bonding a first stator part made of a high-permeability material to a second stator part made of a high-permeability material through an intermediary of connections made of a low-permeability material or a nonmagnetic material, and the connections serve as at least one of the plurality of the holding torque setting means.

3. The two-pole step motor for a timepiece according to claim 1, wherein the stator is made up by bonding a first stator part made of a high-permeability material to a second stator part made of a high-permeability material through an intermediary of connections made of a low-permeability material or a nonmagnetic material.

4. The two-pole step motor for a timepiece according to claim 1, wherein the stator comprises a plurality of holding torque setting means including a combination of different type of the holding torque setting means, and the plurality of holding torque setting means have installation angles, in a direction of an inner periphery of the rotor hole, differing from each other, and the stator is made up by bonding a first stator part made of a high-permeability material to a second stator part made of a high-permeability material through an intermediary of connections made of a low-permeability material or a nonmagnetic material, and the connections serve as at least one of the plurality of the holding torque setting means.

* * * * *